(12) United States Patent
Zohar et al.

(10) Patent No.: US 10,026,116 B2
(45) Date of Patent: Jul. 17, 2018

(54) METHODS AND DEVICES FOR SMART SHOPPING

(71) Applicant: Freshub LTD, Petach Tikva (IL)

(72) Inventors: Meir Zohar, Givat Shmuel (IL); Noam Kronman, Rehovot (IL); Moshe Rosenblum, Petach Tikva (IL)

( * ) Notice: Subject to any disclaimer, the term of this patent is extended or adjusted under 35 U.S.C. 154(b) by 150 days.

(21) Appl. No.: 14/895,375

(22) PCT Filed: Jun. 5, 2014

(86) PCT No.: PCT/IB2014/061992
§ 371 (c)(1),
(2) Date: Dec. 2, 2015

(87) PCT Pub. No.: WO2014/195903
PCT Pub. Date: Dec. 11, 2014

(65) Prior Publication Data
US 2016/0189286 A1     Jun. 30, 2016

Related U.S. Application Data

(60) Provisional application No. 61/831,166, filed on Jun. 5, 2013.

(51) Int. Cl.
*H04N 7/18*     (2006.01)
*H04N 9/47*     (2006.01)
*G06Q 30/06*     (2012.01)
*G06K 9/00*     (2006.01)
*G06F 3/00*     (2006.01)
*G06F 3/01*     (2006.01)

(52) U.S. Cl.
CPC ......... *G06Q 30/0641* (2013.01); *G06F 3/005* (2013.01); *G06F 3/017* (2013.01); *G06K 9/00355* (2013.01); *G06Q 30/0633* (2013.01); *H04N 7/188* (2013.01)

(58) Field of Classification Search
CPC ... H04N 7/18; H04N 9/47; A62B 1/04; A61B 1/04
USPC .................. 348/61, 150, 154, 155, 156, 157
See application file for complete search history.

(56) References Cited

U.S. PATENT DOCUMENTS

| | | |
|---|---|---|
| 6,920,459 B2 | 7/2005 | Debhia et al. |
| 7,117,163 B1 | 10/2006 | Iyer et al. |
| 8,219,456 B2 | 7/2012 | Blumenthal et al. |
| 8,336,761 B1 | 12/2012 | McCloskey |
| 8,520,900 B2 | 8/2013 | Rhoads et al. |
| 2005/0055281 A1 | 3/2005 | Williams |
| 2009/0026269 A1 | 1/2009 | Connell et al. |
| 2009/0052785 A1 | 2/2009 | Shamaie |
| 2010/0116887 A1 | 5/2010 | Barkan et al. |
| 2010/0265311 A1 | 10/2010 | Carpenter, Jr. et al. |

(Continued)

FOREIGN PATENT DOCUMENTS

GB     2463025 A    *   3/2010           G06K 7/1465
WO     WO2013134865       9/2013

*Primary Examiner* — Daquan Zhao
(74) *Attorney, Agent, or Firm* — Michael J. Feigin, Esq.; Feigin and Fridman LLC

(57) ABSTRACT

There are provided methods and devices for improving a shopping experience of a user, including methods and devices for creating, updating, and maintaining a list such as a shopping list and methods and devices for automatically identifying a suitable substitute to a user selected product.

20 Claims, 11 Drawing Sheets

(56) References Cited

U.S. PATENT DOCUMENTS

| | | |
|---|---|---|
| 2010/0306716 A1* | 12/2010 | Perez ............... A63F 13/213 715/863 |
| 2011/0215147 A1 | 9/2011 | Goncalves |
| 2011/0246329 A1 | 10/2011 | Geisner et al. |
| 2011/0252031 A1 | 10/2011 | Blumenthal et al. |
| 2011/0264553 A1 | 10/2011 | Yarvis et al. |
| 2012/0099756 A1 | 4/2012 | Sherman et al. |
| 2012/0119987 A1* | 5/2012 | Im ..................... G06F 3/017 345/156 |
| 2012/0120214 A1 | 5/2012 | Faranda et al. |
| 2012/0233076 A1 | 9/2012 | Sutclifffe et al. |
| 2013/0117269 A1 | 5/2013 | Sacco et al. |
| 2013/0325656 A1 | 12/2013 | Ouimet |
| 2014/0071042 A1* | 3/2014 | Eilat ................... G06F 3/017 345/156 |

\* cited by examiner

METHODS AND DEVICES FOR SMART SHOPPING

RELATED APPLICATIONS

The present application is a continuation of PCT application number PCT/IB2014/061992 filed 5 Jun. 2014, which gains priority from U.S. Provisional Patent Application 61/831,166 filed 5 Jun. 2013, both applications being incorporated herein by reference as if fully set forth herein.

FIELD AND BACKGROUND OF THE INVENTION

The invention, in some embodiments, relates to the field of retail shopping, and more particularly to methods and devices for improving the shopping experience of a user, both when shopping online and when shopping at a physical retail venue.

In many computerized shopping applications currently available in the market, products can be uniquely identified, for example by identifying the Stock Keeping Unit (SKU) of the product, based on extraction of visual features from the package of the product, typically using computer vision and/or image processing methods. However, in existing products, the database containing all the product images is built manually by an operator. In order to keep the database up to date, each change in the packaging of a product must be manually entered by the operator, which often causes inaccuracies due to update backlog or to the operator being unaware of changes to the packaging.

Various devices and products exist, in which hand movements and object movements are translated into commands, for example using computer vision and/or image processing methods. However, these devices typically require use of a specific object, such as a specific remote control, or may recognize a limited number of objects identified by the user during initial setup.

Many shopping applications existing today include data mining or data analysis technologies designed for product matching, such that they can identify products bought together, or bought by a single user, and make suggestions to other users based on such identification. Additionally, product comparison applications exist, particularly for grocery products, which identify, and offer to the user to purchase, a similar product having a better price, or one which is considered healthier. However, these applications do not take into consideration the specific user's preferences, and therefore often suggest grossly irrelevant products to a user, causing the user to waste time reviewing irrelevant suggestions rather than saving the user's time.

Naturally, all shopping applications receive input from the user as to the desired products. Existing speech recognition algorithms and techniques allow users to vocally input information, and of course also recognize terms relating to groceries and other products for which the user may shop. However, shopping applications existing today do not translate the vocal input recognized by speech recognition mechanisms to identification of a specific product, making it difficult and inefficient to receive the user's input in the form of a vocal command.

SUMMARY OF THE INVENTION

Some embodiments of the invention relate to methods and devices for creating a list, such as a list of groceries or of products to be purchased.

According to an aspect of some embodiments of the invention there is provided a method for creating and updating at least one of a list and a database, the method comprising:

triggering an image capturing element to capture at least one image of an object in a vicinity of the image capturing element;

analyzing the at least one image to identify features of the object;

uniquely identifying the object based at least on the identified features;

tracking motion of at least one of the object, another object, and a hand, to detect at least one user gesture;

interpreting the at least one detected user gesture at least based on user-specific information relating to gestures and preferences of a specific user to identify an action associated with the gesture, the action relating to at least one of an update to a list of objects and a change in a display associated with the list of objects; and based on the interpreting, carrying out the action, wherein the user-specific information is learned over time.

In some embodiments, the object comprises a grocery product, and the list comprises a groceries list. In some embodiments the object comprises a retail product, and the list comprises a shopping list. For example, the product may comprise a book, an office supply product, a health care product, a pharmaceutical product, a beauty care product, an electronics product, a media product, an industrial warehouse item, a service sector warehouse item, and any other suitable retail product.

In some embodiments, the object comprises a stock item stocked by a retail venue, and the list comprises a stocking list of the venue. The stock item may be any suitable stock item, such as, for example, electronics, media products, office supplies, books, pharmaceuticals and health care products, grocery products, and beauty products.

The user-specific information may be any suitable user-specific information. That being said, in some embodiments the user-specific information comprises information regarding a purchase history of the user, information regarding a list history of the user, information regarding gestures of the user, information regarding speech of the user, such as information regarding diction or an accent, and information regarding one or more segments of users with which the user is associated.

In some embodiments the triggering comprises manually triggering the image capturing element. In some embodiments the triggering comprises automatically triggering the image capturing element.

In some embodiments, the automatically triggering comprises using at least one sensor, scanning the vicinity of the image capturing element to identify at least one of an object and a triggering event, and triggering said image capturing element upon identification an object and/or a triggering event in the vicinity of the image capturing element.

In some embodiments, the at least one sensor comprises a proximity sensor, and the triggering event comprises a user or an object being at a predetermined proximity to the image capturing element for a predetermined duration.

In some embodiments, the at least one sensor comprises a barcode reader and the triggering event comprises identification of a barcode present in the vicinity of the image capturing element for a predetermined duration. In some such embodiments, the triggering event comprises identification of a specific motion pattern of the barcode in the vicinity of the image capturing element. In some such embodiments, the specific motion pattern of the barcode is user-specific and is learned over time as part of the user-specific information.

In some embodiments, the at least one sensor comprises a Quick Response (QR) code reader and the triggering event comprises identification of a QR code present in the vicinity of the image capturing element for a predetermined duration. In some such embodiments, the triggering event comprises identification of a specific motion pattern of the QR code in the vicinity of the image capturing element. In some such embodiments, the specific motion pattern of the QR code is user-specific and is learned over time as part of the user-specific information.

In some embodiments, the at least one sensor comprises a motion sensor, and the triggering event comprises identification of motion in the vicinity of the image capturing element. In some such embodiments, the triggering event comprises identification of a specific motion pattern in the vicinity of the image capturing element. In some such embodiments, the specific motion pattern is a user-specific motion pattern and is learned over time as part of the user-specific information.

In some embodiments, the user-specific motion pattern forms part of a repertoire of motion patterns associated with a device including the image capturing element, for example when multiple users use the same device.

In some embodiments, the at least one sensor comprises a microphone or other voice sensor and the triggering event comprises identification of a trigger sound, trigger word, or trigger phrase sounded in the vicinity of the image capturing element.

In some embodiments, the at least one sensor comprises an RFID sensor and the triggering event comprises identification of an RFID tag in the vicinity of the image capturing element.

In some embodiments, the at least one sensor comprises a three dimensional sensor and the triggering event comprises identification of a three dimensional object in the vicinity of the image capturing element. In some such embodiments, the three dimensional sensor is aided by illumination of the object using structured light.

In some embodiments, the user-specific information comprises information relating to user-specific triggering aspects, including one or more of:

a distance of the user from the image capturing element at the time of triggering;

a triggering gesture used by the user at the time of triggering;

a speed of the triggering gesture;

timing of the triggering gesture;

a duration for which the user is in the vicinity of the image capturing element for the purpose of triggering;

characteristics of a holding pattern in which the user holds the object during triggering;

a tendency of the user to trigger action of a device associated with the image capturing element using a vocal command; and characteristics of a sequence of actions carried out by the user to trigger action of the device.

In some embodiments, the automatically triggering comprises recognizing at least one predetermined triggering gesture performed by the user, and the user-specific information comprises user-specific nuances of the at least one predetermined triggering gesture. In some embodiments the triggering comprises analyzing behavior of the user to identify a specific action which the user wishes to carry out and activating specific components of a device associated with the image capturing element, which components are suited for carrying out the identified specific action.

In some embodiments, the automatically triggering comprises, using the image capturing element, capturing at least one triggering image at a trigger imaging rate, and identifying at least one of an object and a triggering event in the at least one triggering image, thereby to trigger capturing of the at least one image. The trigger imaging rate may be any suitable imaging rate. That being said, in some embodiments the trigger imaging rate is not more than 10 images per second, not more than 5 images per second, not more than 2 images per second, or not more than one image per second, so as to conserve energy while an object is not in the vicinity of the image capturing element.

In some embodiments, the at least one triggering image comprises a low quality image, such as a black and white image or a low resolution image.

In some embodiments, the identifying an object in the at least one triggering image comprises identifying a boundary of an object in the at least one triggering image. In some such embodiments, the identifying an object also comprises eliminating background information from the at least one triggering image prior to identifying the boundary.

In some embodiments, the identifying an object in the at least one triggering image comprises analyzing at least one triggering image to identify a three dimensional structure of the object in the at least one triggering image.

In some embodiments, the identifying an object in the at least one triggering image comprises identifying at least one visual feature of the object in the at least one triggering image. In some such embodiments the at least one visual feature comprises at least one of the presence of writing on the object, the presence of graphics on the object, coloring of the object, the presence of watermarks on the object, and/or the three dimensional structure of the object.

In some embodiments, the identifying a triggering event in the at least one triggering image comprises comparing at least two of the triggering images to identify motion of the object in the vicinity of the image capturing element. In some such embodiments, the identifying a triggering event comprises identifying a specific motion pattern in vicinity of the image capturing element in the at least two triggering images. In some such embodiments, the specific motion pattern is user-specific and is learned over time as part of the user-specific information.

In some embodiments, the triggering also comprises interrupting a software program or application previously running on a device including the image capturing element, to enable capturing of the image and processing thereof by the device.

In some embodiments, the triggering comprises managing availability of computational resources for at least one of analyzing the at least one image, uniquely identifying the object, tracking motion, interpreting the detected user gesture, and carrying out the action, by activating the computational resources based on data obtained during the triggering. In some such embodiments, the managing availability comprises, if a triggering event is not definitively identified, activating computational resources configured to determine whether a triggering event has occurred.

In some embodiments, the triggering comprises identifying a change of object in the vicinity of the image capturing element, and triggering the image capturing element to capture at least one image of the newly provided object.

In some embodiments, the method also comprises illuminating the object during capturing the at least one image of the object by the image capturing element. In some such embodiments, the illuminating comprises illuminating the object using a dedicated illumination source. In some embodiments, the illuminating comprises illuminating the object using monochromatic illumination. In some embodiments, the illuminating comprises illuminating the object using polychromatic illumination.

In some embodiments, the illuminating comprises illuminating the object using backlighting of a display associated with the image capturing element. In some such embodiments, the at least one image captured by the image capturing element comprises a plurality of images, and the using backlighting comprises using the backlighting of the display to illuminate the object in a controlled fashion so as to illuminate the object from different angles, thereby to generate different shadow patterns in different ones of the plurality of images.

In some embodiments, using the backlighting to illuminate the object in a controlled fashion comprises using the backlighting to illuminate the object with patterned monochromatic illumination. For example, illuminating with patterned monochromatic illumination may include initially illuminating the object with blue light, subsequently illuminating the object with green light, and then illuminating the object with red light.

In some embodiments illuminating the object comprises illuminating the object in at least one of a scattered illumination pattern and a structured illumination pattern.

The vicinity of the image capturing element may be of any suitable radius or distance. That being said, in some embodiments, the vicinity of the image capturing element in which the at least one image is captured is user-specific and is learned over time as part of the user-specific information.

In some embodiments, analyzing the at least one image comprises identifying visual features of the object in the at least one image. In some embodiments, analyzing the at least one image comprises virtually combining a plurality of images of the object captured by the image capturing element and identifying the visual features in the virtually combined image. In some such embodiments the visual features include at least one of an image printed on the object, coloring of the object, text or lettering printed on the object, watermarks on the object, and other graphic forms on the object, both visible to the human eye and invisible to the human eye.

In some embodiments, analyzing the at least one image comprises identifying unique object characteristics in the at least one image. In some such embodiments the unique object characteristics comprise at least one of a barcode and a QR code.

In some embodiments, analyzing the at least one image comprises identifying a three dimensional structure of the object in the at least one image. In some such embodiments, the at least one image comprises at least two images, which are combined to identify a three dimensional structure of the object. In some such embodiments, shadow patterns in the at least two images are used to identify the three dimensional structure of the object. The shadow patterns in the at least two images may be caused naturally, or may be generated by illumination with structured light and/or with scattered light.

In some embodiments, uniquely identifying the object comprises finding in an object-feature database an object entry including at least some of the identified features of the object. In some embodiments, uniquely identifying the object comprises finding in an object-feature database an object entry including all of the identified features of the object.

In some embodiments, the uniquely identifying the object comprises uniquely identifying the object based on one or more of the user-specific information and information relating to users of a specific device including the image capturing element. In some embodiments, the method also comprises associating each user with at least one user-segment, and the uniquely identifying the object comprises uniquely identifying the object also based on segment-specific information relating to at least one of gestures and preferences of users in the user-segment, the segment-specific information being learned over time. In some embodiments, the interpreting is also based on segment-specific information.

In some embodiments, the uniquely identifying the object comprises uniquely identifying the object based on input provided by the user via an input entry element. In some embodiments, when analyzing the at least one image does not identify a sufficient number of features for uniquely identifying the object, the uniquely identifying comprises using at least one of input captured during the capturing of the image and input provided by the user via an input entry element, uniquely identifying the object, and following the uniquely identifying the object based on the input, updating an entry for the object in an object-feature database.

In some embodiments, the user input is provided by detection of motion of the object, as described hereinbelow. In some such embodiments, the method also comprises learning from the input provided by the user additional characteristics of the user to be included in the user-specific information.

In some embodiments, the method also comprises following unique identification of the object using the user input, updating an entry of the object in the object-feature database. For example, if user input was required due to a change in the object packaging which changed some of the object features, the database may be updated with features of the new packaging.

In some embodiments the method also comprises, following unique identification of the object, rendering a virtual model of the object on a display functionally associated with the image capturing element, and/or displaying information regarding the object and/or the list on the display. In some such embodiments the method also comprises providing an indication of the action on the display. In some embodiments, providing an indication of the action comprises providing an animation of the action on the display.

In some embodiments, tracking motion of the object comprises analyzing the at least one image of the object captured by the image capturing element, the analyzing comprising:

using the unique identification of the object, extracting from an object-feature database a three dimensional structure of the object; and using the extracted three dimensional structure, tracking the object to identify a trajectory of motion thereof.

In some embodiments, the tracking motion comprises identifying in an image signature of the object a three dimensional area having at least one strong spatial gradient, and tracking the area to identify a trajectory of motion of the object. In some embodiments, the tracking motion comprises extracting a plurality of measurements of local features distributed at different locations of the at least one image of the object, and tracking the local features to identify a trajectory of motion of the object.

In some embodiments, interpreting the user gesture comprises using the user-specific information to identify a user-specific gesture associated with a specific action corresponding to the tracked motion.

As mentioned above, in some embodiments, each user is associated with at least one user-segment, for example a segment of children, of females, or of elderly people. In some such embodiments, interpreting the user gesture is also based on information relating to the user-segment for the specific user. In some embodiments, the user is associated with a segment based on predefined characteristics of the user, such as sex, age, and the like. In some embodiments the segment with which the user is associated is learned over time, for example based on the user's list history or based on the types of objects the user presents to the image capturing element. In some embodiments the information relating the user-segment, such as objects used by the user-segment or preferences of users in the user-segment, is learned over time.

In some embodiments, interpreting the user gesture comprises using at least one of the user-specific information and information regarding at least one physical-feature of the object to identify a user-specific gesture associated with a specific action corresponding to the tracked motion.

In some embodiments, each object is associated with at least one object-segment, for example a segment of heavy objects, of light objects, of fragile objects, or of perishable objects. In some such embodiments, interpreting the user gesture is also based on information relating to the object-segment for the identified object, with respect to all users or with respect to a specific user.

In some embodiments, the at least one physical feature of the object comprises at least one of a weight of the object, dimensions of the object, and a three dimensional shape of the object. For example, the interpretation of the same gesture may be different if the user is holding a heavy object or if the user is holding a light object.

In some embodiments, the interpreting is also based on device-specific information relating to users of a specific device including the image capturing element, which device-specific information is learned over time.

In some embodiments, the action comprises at least one of:
  adding a specific number of occurrences of the object to the list;
  removing a specific number of occurrences of the object from the list;
  displaying at least one object that can be used as a substitute for the identified object;
  displaying information relating to the identified object;
  displaying the list;
  replacing the object in the list by a substitute object;
  searching in a database for a specific object;
  searching in a database for an object which is similar to the identified object;
  filtering the list by a suitable criterion, such as by an object feature;
  sorting the list according to a suitable order, such as popularity, relevance, size, location in a store, and the like;
  displaying a subset of objects, for example only objects that have previously been purchased by the user;
  displaying information relating to an object history of the user; and
  requesting help or support.

In some embodiments, each action type is associated with a different user gesture. In some embodiments, for a specific user, each user gesture is associated with a single action type.

In some embodiments, the object comprises a single unit of a multi-unit object packaging, and the uniquely identifying also comprises using the unique identification of the object, uniquely identifying a multi-unit object packaging associated with the object. In some such embodiments, carrying out the action comprises carrying out the action with respect to the multi-unit object packaging.

In some embodiments, the method also comprises receiving a voice command for at least one of updating the list of objects and changing the display associated with the list of objects. A detailed explanation as to how an object is identified using the voice command is provided hereinbelow. Once the object is identified, for example with a high enough confidence level, as described hereinbelow, the action is automatically carried out with respect to the identified object, and the user is presented with an option to "undo" this action.

In some embodiments, if no action associated with the detected user gesture is identified, the method also comprises:
  obtaining additional input regarding the detected gesture;
  characterizing aspects of the detected gesture;
  identifying whether the gesture is a repeated gesture;
  if the gesture is not identified as a repeated gesture, storing the gesture as a potential gesture; and
  if the gesture is identified as a repeated gesture:
    identifying at least one of whether the gesture is user dependent and whether the gesture is package dependent;
    associating an action with the gesture; and
    storing the gesture and the action associated therewith based on the identified user dependence and/or package dependence.

In accordance with an aspect of some embodiments of the invention there is provided a method for learning a user-specific gesture, comprising:
  obtaining a detected user gesture not having an identified action associated with the gesture;
  obtaining additional input regarding the detected gesture;
  characterizing aspects of the detected gesture;
  identifying whether the gesture is a repeated gesture;
  if the gesture is not identified as a repeated gesture, storing the gesture as a potential gesture; and
  if the gesture is identified as a repeated gesture:
    identifying at least one of whether the gesture is user dependent and whether the gesture is package dependent;
    associating an action with the gesture; and
    storing the gesture and the action associated therewith based on the identified user dependence and/or package dependence.

In some embodiments, obtaining the additional input comprises receiving additional input from the user. In some such embodiments, receiving the additional input comprises receiving from the user a vocal command corresponding to the unidentified gesture. In some such embodiments, receiving the additional input comprises the user interacting with an input entry element to select a desired action to be carried out.

In some embodiments, obtaining the additional input comprises obtaining segment-specific input relating to a user-segment with which the user is associated. For example, if the user is associated with a segment of elderly people, the gesture may be better identified based on characteristics of that segment.

In some embodiments, the characterizing comprises characterizing at least one of a trajectory of the gesture, a pattern of motion when performing the gesture, angles at which the gesture is performed, and distances of motion when performing the gesture.

In some embodiments, identifying whether the gesture is a repeated gesture comprises identifying if the user repeats the gesture shortly after detection of the gesture. In some embodiments, identifying whether the gesture is a repeated gesture comprises identifying that the gesture was stored as a potential gesture.

In some embodiments, identifying whether the gesture is a repeated gesture comprises identifying that the repeated gesture does not reflect an intention of the user to carry out an action.

In some embodiments, associating an action with the gesture comprises identifying an action that follows a repeated user gesture more than a predetermined number or percentage of times, and associating the identified action with the gesture. In some embodiments, associating the action with the gesture is carried out manually by the user or by an operator of the user information database.

In some embodiments, at least one of the analyzing, uniquely identifying, interpreting, and carrying out the action is carried out at a server located remotely to the image capturing element. In some such embodiments, the server is functionally associated with the object-feature database and/or with the user information database. In some such embodiments the method also comprises transmitting the images captured by the image capturing element to the server. In some such embodiments the method also comprises transmitting the detected user gesture to the server.

In some embodiments, at least one of the analyzing, uniquely identifying, interpreting, and carrying out the action is carried out locally to the image capturing element.

In some embodiments, the method also comprises following the unique identification of the object, displaying at least one of information relating to the identified object, a virtual model of the identified object, and the list, on a display associated with the image capturing element.

The method for creating a list described herein may be carried out using any suitable device. That being said, according to an aspect of some embodiments of the invention there is provided a device for creating and updating a list or a database, the device comprising:

an information learner configured to learn user-specific information which relates to gestures and preferences of a specific user over time and to store the learned user-specific information;

a triggering module configured to identify a triggering event;

an image capturing element, functionally associated with the triggering module, and configured to be triggered by the triggering module, following identification of a the triggering event, to capture at least one image of an object in a vicinity of the image capturing element; and an object identifier functionally associated with the image capturing element and configured to analyze the at least one image captured by the image capturing element, to identify features of the object, and to uniquely identify the object based at least on the identified features;

a motion identifier configured to track motion of at least one of the object, another object, and a hand to detect at least one user gesture;

a gesture interpreter, functionally associated with the motion identifier and with the information learner, configured to interpret the at least one detected user gesture based at least on the user-specific information to identify an action associated with the gesture, the action relating to at least one of an update to a list of objects and a change in a display associated with the list of objects; and an action module functionally associated with the gesture interpreter and configured, based on the interpretation of the gesture interpreter, to carry out the action associated with the gesture.

In some embodiments the information learner is also configured to learn, over time, object-specific information which relates to characteristics of the object and/or segment-specific information which relates to characteristics and objects associated with or used by a segment of users.

In some embodiments, the object comprises a grocery product, and the list comprises a groceries list. In some embodiments the object comprises a retail product, and the list comprises a shopping list. For example, the product may comprise a book, an office supply product, a health care product, a pharmaceutical product, a beauty care product, an electronics product, a media product, an industrial warehouse item, a service sector warehouse item, and any other suitable retail product.

In some embodiments, the object comprises a stock item stocked by a retail venue, and the list comprises a stocking list of the venue. The stock item may be any suitable stock item, such as, for example, electronics, media products, office supplies, books, pharmaceuticals and health care products, grocery products, and beauty products.

In some embodiments, the information learner is configured to learn at least one of information regarding a purchase history of the user, information regarding a list history of the user, information regarding gestures of the user, information regarding speech of the user, such as information regarding diction or an accent, and information regarding one or more segments of users with which the user is associated.

In some embodiments the information learner is functionally associated with a user information database and is configured to store the learned information in the user information database.

In some embodiments the triggering module is configured to identify, as the triggering event, a user manually triggering the image capturing element. In some embodiments the triggering module is configured to automatically identify a triggering event and to trigger the image capturing element.

In some embodiments, the triggering module comprises at least one sensor, which sensor is configured to scan the vicinity of the image capturing element to identify at least one of an object and a triggering event, and the triggering module is configured to trigger the image capturing element upon identification of the object and/or the triggering event in the vicinity of the image capturing element.

In some embodiments, the at least one sensor comprises a proximity sensor configured to identify a user or an object being at a predetermined proximity to the image capturing element for a predetermined duration as the triggering event.

In some embodiments, the at least one sensor comprises a barcode reader configured to identify a barcode present in the vicinity of the image capturing element for a predetermined duration as the triggering event. In some such embodiments, the triggering event comprises identification of a specific motion pattern of the barcode in the vicinity of the image capturing element. In some such embodiments, the specific motion pattern of the barcode is user-specific and is learned over time as part of the user-specific information.

In some embodiments, the at least one sensor comprises a Quick Response (QR) code reader configured to identify a QR code present in the vicinity of the image capturing element for a predetermined duration as the triggering event. In some such embodiments, the triggering event comprises identification of a specific motion pattern of the QR code in the vicinity of the image capturing element. In some such embodiments, the specific motion pattern of the QR code is user-specific and is learned over time as part of the user-specific information.

In some embodiments, the at least one sensor comprises a motion sensor, configured to identify motion in the vicinity of the image capturing element as the triggering event. In some such embodiments, the motion sensor is configured to identify a specific motion pattern in the vicinity of the image capturing element as the triggering event. In some such embodiments, the motion sensor is functionally associated with the information learner, and the specific motion pattern is user-specific and comprises part of the user-specific information.

In some embodiments, the user-specific motion pattern forms part of a repertoire of motion patterns learned by the information learner and associated with a specific device. For example, when the device is placed in a household, the information learner learns a repertoire of motion patterns suited for all members of the household.

In some embodiments, the at least one sensor comprises a microphone or other voice sensor configured to identify a trigger sound, trigger word, or trigger phrase sounded in the vicinity of the image capturing element as the triggering event.

In some embodiments, the at least one sensor comprises an RFID sensor configured to identify an RFID tag in the vicinity of the image capturing element as the triggering event.

In some embodiments, the at least one sensor comprises a three dimensional sensor configured to identify a three dimensional object in the vicinity of the image capturing element as the triggering event. In some such embodiments, the three dimensional sensor is aided by illumination of the object using structured light.

In some embodiments, the information learner is configured to learn information relating to user-specific triggering aspects, the user-specific triggering aspects including at least one of:

a distance of the user from the image capturing element at a time of triggering the image capturing element by the triggering module;

a triggering gesture used by the user at the time of triggering;

a speed of the triggering gesture;

timing of the triggering gesture;

a duration at which the user is in the vicinity of the device for the purpose of triggering;

characteristics of a holding pattern in which the user holds the object during triggering;

a tendency of the user to trigger action of the device using a vocal command; and characteristics of a sequence of actions carried out by the user to trigger action of the device.

In some embodiments, the triggering module is configured to recognize at least one predetermined triggering gesture performed by the user, and the information learner is configured to learn user-specific nuances of the at least one predetermined triggering gesture.

In some embodiments, the triggering module is configured to analyze behavior of the user to identify a specific action which the user wishes to carry out, and activate specific components of the device, which components are suited for carrying out the identified specific action.

In some embodiments, the image capturing element is configured to capture at least one triggering image at a trigger imaging rate, and the triggering module is configured to identify at least one of an object and a triggering event in the at least one triggering image captured by the image capturing element as the triggering event. The trigger imaging rate may be any suitable imaging rate. That being said, in some embodiments the trigger imaging rate is not more than 10 images per second, not more than 5 images per second, not more than 2 images per second, or not more than one image per second, so as to conserve energy while an object is not in the vicinity of the image capturing element.

In some embodiments, the image capturing element is configured to capture a low quality image as the at least one triggering image, such as a black and white image or an image in a low resolution.

In some embodiments, the triggering module is configured to identify an object in the at least one triggering image by identifying a boundary of an object in the at least one triggering image. In some such embodiments, the triggering module is also configured to eliminate background information from the at least one triggering image prior to identifying the boundary.

In some embodiments, the triggering module is configured to identify a three dimensional structure of the object in the at least one triggering image, thereby to identify a triggering event.

In some embodiments, the triggering module is configured to identify an object in the at least one triggering image by identifying at least one visual feature of the object in the at least one triggering image. In some such embodiments the triggering module is configured to identify at least one of the presence of writing on the object, the presence of graphics on the object, coloring of the object, and/or the presence of watermarks on the object.

In some embodiments, the at least one triggering image comprises at least two triggering images, and the triggering module is configured to identify a triggering event in the at least to triggering image by comparing the triggering images to identify motion of the object in the vicinity of the image capturing element. In some such embodiments, the triggering module is configured to identify a specific motion pattern in vicinity of the image capturing element in the at least two triggering images. In some such embodiments, the triggering module is configured to identify a user-specific motion pattern which is learned over time by the information learner as part of the user-specific information.

In some embodiments, the triggering module is also configured to interrupt a software program or application previously running on the device.

In some embodiments, the triggering module is configured to manage availability of computational resources for at least one of the information learner, the object identifier, the motion identifier, the gesture interpreter, and the action module, by activating the computational resources based on data obtained during triggering of the image capturing element. In some embodiments, the triggering module is configured, if a triggering event is not definitively identified, to activate computational resources configured to determine whether a triggering event has occurred.

In some embodiments, the triggering module is configured to identify a change of object in the vicinity of the image capturing element, and to trigger the image capturing element to capture at least one image of the newly provided object.

In some embodiments, the device also comprises an illumination source configured to illuminate the object during the image capturing. In some such embodiments, the illumination source is configured to emit monochromatic illumination. In some such embodiments, the illumination source is configured to emit polychromatic illumination. In some such embodiments, the illumination source is configured to illuminate the object in at least one of a structured illumination pattern and a scattered illumination pattern.

In some embodiments, the illumination source comprises backlighting of a display associated with the device. In some embodiments, the backlighting of the display is configured to illuminate the object in a controlled fashion so as to illuminate the object from different angles, thereby to generate different shadow patterns in different ones of the plurality of images.

In some embodiments, the backlighting of the display is configured to illuminate the object with patterned monochromatic illumination. For example, the display backlighting may initially illuminate the object with blue light, subsequently illuminate the object with green light, and then illuminate the object with red light.

The triggering module is configured to identify a triggering event in any suitable radius or distance from the image capturing element. That being said, in some embodiments, the information leaner is configured to learn the magnitude of the vicinity of the device in which the at least one image is captured for a specific user over time, as part of the user-specific information.

In some embodiments, the object identifier is configured to identify visual features of the object in the at least one image. In some embodiments, the object identifier is configured to virtually combine a plurality of images of the object captured by the image capturing element and to identify the visual features in the virtually combined image. In some such embodiments, the object identifier is configured to identify at least one of an image printed on the object, coloring of the object, text or lettering printed on the object, watermarks on the object, and other graphic forms on the object, both visible to the human eye and invisible to the human eye.

In some embodiments, the object identifier is configured to identify unique object characteristics in the at least one image. In some such embodiments the object identifier is configured to identify at least one of a barcode and a QR code as the unique object characteristics.

In some embodiments, the object identifier is configured to identify a three dimensional structure of the object in the at least one image. In some such embodiments, the at least one image comprises at least two images, and the object identifier is configured to combine the at least two images and to identify a three dimensional structure of the object in the combined image. In some such embodiments, the object identifier is configured to use shadow patterns in the at least one image to identify the three dimensional structure of the object. In some such embodiments, the shadow patterns are natural. In some embodiments, the shadow patterns in the at least one image are generated by illumination of the object with structured light and/or with scattered light.

In some embodiments, the object identifier is functionally associated with an object-feature database and is configured to uniquely identify the object by finding in the object-feature database an object entry including at least some of the identified features of the object. In some embodiments, the object identifier is configured to uniquely identify the object by finding in an object-feature database an object entry including all of the identified features of the object.

In some embodiments, the object identifier is configured to uniquely identify the object also based on at least one of the user-specific information and information relating to users of a specific device. For example, the object identifier may identify an orientation in which the user is holding the object and thereby narrow the possible identifications of the object.

In some embodiments, information learner is configured to associate each user with at least one user-segment, and to learn segment-specific information relating to at least one of gestures and preferences of users in the user-segment over time, and the object identifier is configured to uniquely identify the object also based on the segment-specific information.

For example, the information learner may learn, for example from objects previously identified for a specific user, that the specific user is a vegetarian, and subsequently the object identifier can narrow the possible identifications of the object only to objects suitable for vegetarians.

In some embodiments, the device also comprises an input entry element configured to receive input from the user, and the object identifier is configured to uniquely identify the object also based on the input provided by the user via the input entry element.

In some embodiments, the input entry element comprises the image capturing element and the input comprises motion of the object along a specific trajectory, as described hereinbelow. In some such embodiments, the information learner is also configured to learn from the input provided by the user additional characteristics of the user to be included in the user-specific information.

In some embodiments, the object identifier is configured, following unique identification of the object using the user input, to update an entry for the object in the object-feature database. For example, if user input was required due to a change in the object packaging which changed some of the object features, the object identifier may update the database with features of the new packaging.

In some embodiments, the object identifier does not identify a sufficient number of features for uniquely identifying the object, and is configured to use at least one of input captured during capturing of the image and input provided by the user via the input entry element to uniquely identify the object, and to update an entry for the object in the object-feature database following the unique identification of the object based on the input.

In some embodiments, the motion identifier is configured to use the unique identification of the object to extract from the object-feature database a three dimensional structure of the object, and to use the extracted three dimensional structure to track the object in at least two images captured by image capturing element, thereby to identify a trajectory of motion of the object.

In some embodiments, the motion identifier is configured to identify in an image signature of the object a three dimensional area having at least one strong spatial gradient, and to track the area thereby to identify a trajectory of motion of the object. In some embodiments, the motion identifier is configured to extract a plurality of measurements of local features distributed at different locations of the image of the object, and to track the local features thereby to identify a trajectory of motion of the object.

In some embodiments, the user gesture interpreter is functionally associated with information learner and is configured to use the user-specific information to identify a user-specific gesture associated with a specific action corresponding to the identified trajectory of motion.

As mentioned above, in some embodiments, each user is associated with at least one user-segment, for example a segment of children, of females, or of elderly people. In some such embodiments, the user gesture interpreter is configured to interpret the user gesture also based on information relating to the user-segment for the specific user. In some embodiments, the user is associated with a segment based on predefined characteristics of the user, such as sex, age, and the like. In some embodiments the segment with which the user is associated is learned over time, for example based on the user's list history or based on the types of objects the user presents to the image capturing element. In some embodiments, the information relating to the user-segment, such as objects used by users or preferences of users in the user-segment, is learned over time.

In some embodiments, the user gesture interpreter is configured to use the user-specific information and/or information regarding at least one physical-feature of the object to identify a user-specific gesture associated with a specific action corresponding to the identified trajectory of motion.

In some embodiments, each object is associated with at least one object-segment, for example a segment of heavy objects, of light objects, of fragile objects, or of perishable objects. In some such embodiments, the user gesture interpreter is configured to interpret the user gesture is also based on information relating to the object-segment for the identified object, with respect to all users or with respect to a specific user.

In some embodiments, the at least one physical feature of the object comprises at least one of a weight of the object, dimensions of the object, and a three dimensional shape of the object. For example, the interpretation of the same gesture may be different if the user is holding a heavy object or if the user is holding a light object.

In some embodiments, the information learner is configured to learn device-specific information relating to users of a specific device over time, and wherein the gesture interpreter is configured to interpret the gesture also based on the device-specific information.

In some embodiments, the user gesture interpreter is configured to identify an action comprising at least one of:
  adding a specific number of occurrences of the object to the list;
  removing a specific number of occurrences of the object from the list;
  displaying at least one object that can be used as a substitute for the identified object;
  displaying information relating to the identified object;
  displaying the list;
  replacing the object in the list by a substitute object;
  searching in a database for a specific object;
  searching in a database for an object which is similar to the identified object;
  filtering the list by a suitable criterion, such as by an object feature;
  sorting the list according to a suitable order, such as popularity, relevance, size, location in a store, and the like;
  displaying a subset of objects, for example only objects that have previously been purchased by the user;
  displaying information relating to an object history of the user; and
  requesting help or support.

In some embodiments, each action type is associated with a different user gesture. In some embodiments, for a specific user, each user gesture is associated with a single action type.

In some embodiments, the object comprises a single unit of a multi-unit object packaging, and the object identifier is configured to use the unique identification of the object to uniquely identify the multi-unit object packaging associated with the object. In some such embodiments, the action module is configured to carry out the action identified by the user gesture interpreter with respect to the multi-unit object packaging.

In some embodiments, the device also comprises a voice sensor, such as a microphone, configured to receive a voice command for at least one of updating the list of objects and changing the display associated with the list of objects. A detailed explanation as to how an object is identified using the voice command is provided hereinbelow.

In some embodiments, if the gesture interpreter is not able to identify an action associated with the detected user gesture, the gesture interpreter is also configured to:
  obtain additional input regarding the detected gesture;
  characterize aspects of the detected gesture;
  identify whether the gesture is a repeated gesture;
  if the gesture is not identified as a repeated gesture, store the gesture as a potential gesture; and
    if the gesture is identified as a repeated gesture:
      identify at least one of whether the gesture is user dependent and whether the gesture is package dependent;
      associate an action with the repeated gesture; and
      store the gesture and the action associated therewith based on the identified dependence.

In some embodiments, the gesture interpreter is configured to obtain input relating to the object as the additional input. In some embodiments, the gesture interpreter is configured to receive additional input from the user. In some such embodiments, the gesture interpreter is configured to receive from the user a vocal command corresponding to the unidentified gesture. In some such embodiments, the gesture interpreter is configured to receive input obtained by the user interacting with an input entry element to select a desired action to be carried out.

In some embodiments, the gesture interpreter is configured to obtain segment-specific input relating to a user-segment with which the user is associated. For example, if the user is associated with a segment of elderly people, the gesture may be better identified based on characteristics of that segment.

In some embodiments, the gesture interpreter is configured to characterize at least one of a trajectory of the gesture, a pattern of motion when performing the gesture, angles at which the gesture is performed, and distances of motion when performing the gesture In some embodiments, the gesture interpreter is configured to identify whether the gesture is a repeated gesture by identifying if the user repeats the gesture shortly after detection of the gesture. In some embodiments, the gesture interpreter is configured to identify whether the gesture is a repeated gesture by identifying that the gesture was stored as a potential gesture.

In some embodiments, the gesture interpreter is configured to identify that the repeated gesture does not reflect an intention of the user to carry out an action.

In some embodiments, the gesture interpreter is configured identify an action that follows a repeated user gesture more than a predetermined number or percentage of times, and to associate the identified action with the repeated user gesture.

In some embodiments, at least one of the information learner, the object identifier, the gesture interpreter, and the action module are located at a server remote from the image capturing element. In some such embodiments, the device also comprises a transceiver configured to transmit the captured images and/or the detected user gesture to the remote server, and to receive computation output from the remote server. In some embodiments, the user information database and/or the object-feature database are local to the device. In some embodiments, the user information database and/or the object-feature database are remote from the device and are functionally associated therewith.

In some embodiments, the device also comprises a display, functionally associated with the object identifier, and the object identifier is configured, following unique identification of the object, to render an image or a model of the identified object on the display, and/or to display information regarding the object and/or the list on the display. In some embodiments, the display is also functionally associated with the action module, and upon carrying out of the action by the action module an indication of the action is rendered on the display. In some such embodiments, the indication of the action is rendered on the display by providing an animation of the action on the display.

Some embodiments of the invention relate to methods and devices for identifying a suitable product for use by a user, such as a substitute product or a specific product based on a non-specific designation of the product.

According to an aspect of some embodiments of the invention there is provided a method for identifying a suitable product for a user, the method comprising:

obtaining a product dataset comprising a group of products, the products being divided into subgroups according to title, wherein each product is associated with at least one of a brand and a set of features describing the product, and wherein a weight is associated with the brand and with each feature;

receiving from a user an initial identification of a desired product having a specific title associated therewith;

using information in the product dataset and at least one of user-specific information and device-specific information, uniquely identifying a specific desired product intended by the user in the initial identification;

using at least some of the weights of the brand and of the features, computing a distance between the specific desired product and at least two other products in the specific title; and identifying at least one of the other products, having a small distance from the specific desired product, as a suitable product for the user.

The group of products may be any suitable group of products. That being said, in some embodiments the group of products comprises grocery products, electronics, books, pharmaceutical products, health care products, beauty care products, manufacturing products, agricultural products, games, gaming products, toys, clothing, shoes, entertainment products such as plays, concerts, and movies, vehicles, such as cars, motorcycles, and yachts, and the like.

In some embodiments, the title comprises the natural name of a product. Exemplary titles may include, "milk", "fresh produce", "frozen vegetables", "children's books", "non-fiction books", and the like. Typically, each title has a plurality of products associated therewith. For example, fat free milk, low fat milk, whole milk, lactose free milk, and soy milk, are all associated with the title "milk".

In some embodiments, the brand relates to a manufacturer or distributor of the product. As such, in some embodiments, many products share a single brand. For example, the brand "Kit-Kat" may be associated with the products "Kit-Kat, 36-Count" and "KIT KAT CHUNKY Peanut Butter 48 g". In some embodiments, a single product may be associated with more than one brands, for example products associated with the brand "Kit-Kat" may also be associated with the brand "Nestle".

The features associated with a product may be any suitable features which describe the product, and may include, for example, flavor, nutritional identifications such as "diet", "low fat", "sugar free", "gluten free", and "lactose free", denominational identifications such as "vegetarian", "vegan", "Kosher", and "Halal", price, size of packaging, and the like. Typically, each feature is associated with a set of possible values which it may receive.

In some embodiments, obtaining the product dataset comprises, for each product, automatically identifying the product's title, brand, and features, and automatically building an entry in the product dataset using at least one of keywords in the product name, keywords in the product description, keywords found on the packaging of the product, and information gleaned from external sources, such as manufacturer and distributor websites. In some embodiments in which the product comprises a food product, building the entry additionally uses information gleaned from nutritional values of the product, and information gleaned from the list of ingredients of the product.

In some embodiments, the dataset may be automatically obtained at suitable locations. For example, in a supermarket, images obtained by security cameras observing the checkout points may be correlated with barcode and other information registered by the cashier during checkout, and each product identified this way may be added to the dataset or updated within the dataset. In such cases OCR may be used to extract brand and feature information from the captured image of the package.

In some embodiments, a human operator oversees the dataset creation, and may approve the information collected for each product and/or may add other information for each product. In some such embodiments, the human operator may also identify mistakes in the creation of the dataset, such as associating a product with the wrong title, and may use machine learning techniques to "teach" the system how to avoid such mistakes.

As described in further detail hereinbelow, in some embodiments, the weights associated with the brand and with the features of each product are user-specific. In some embodiments, the user-specific weights are manually determined by user input. In some such embodiments, the user-specific weights are learned over time, for example based on choices the user makes after being offered the choice of two or more suitable products, or based on the user's product history. As an example, if the user's product history shows that when selecting a product the user is oblivious to the color of the product, the weight of the "color" feature is automatically lowered for that product, for that title, or for all products, with respect to the user.

Similarly, the user may specify, or the system may learn, a filtering criterion for the user. For example, the user may specify that he is vegetarian, or the system may learn from the user's product history that the user only purchases vegetarian products, and may then increase the weight of the "vegetarian" feature so that vegetarian products are more likely to, and in some embodiments only vegetarian products will, be selected as suitable products for the user.

In some embodiments, the weights associated with the brand and with the features of each product are segment-specific. In some such embodiments, each user is associated with one or more user-segments, and user-specific weights are assigned to the brand and/or to the features based on the user-segment with which the user is associated. For example, in the context of food products, the user may be associated with a segment of vegetarians, and suitable weights are assigned to the brand and to the features of products for users in that segment, for example giving a weight of zero for each product containing meat. In some such embodiments, assigning the weights comprises aggregating information relating to product history and substitute product selection history for all users in a segment, and adjusting the weights for the segment based on the aggregated information, in a form of crowd sourcing.

In some embodiments, the user is automatically associated with one or more user-segments based on user-specific information such as the user's purchase history, as known in the art.

In some embodiments, the weights associated with the brand and with the features of each product are also determined based on market trends and/or on seasons. For example, during the winter, a higher weight may be given to a feature of "eaten hot", and a lower weight may be given to a feature of "eaten frozen".

As another example, during holiday seasons, a higher weight may be given to holiday related features such as "contains chocolate mint", "suitable for holiday", "suitable for hosting", "elegant", and the like.

In some embodiments, the information learner automatically learns the seasonal effects for a user, a user-segment, or for the general population, and automatically sets the weights accordingly during the suitable season.

In some embodiments, the weights associated with the brand and with the features of each product are also determined based on the user's priorities. In some such embodiments, the method also comprises, for each specific user, obtaining user-specific product priorities, and automatically adjusting the weights of the brand and/or of the features based on the user-specific product priorities. Typically, product priorities relate to a category of products or features which should be given a higher or lower weight than that calculated based on the user-segment or user history, or which should override other features or products.

In some embodiments, the product priorities are expressly provided by the user, for example through an input entry element. In other embodiments, the user's priorities are learned over time, for example by analyzing the user's product history or which substitutes the user selects for a specific product.

For example, the user may indicate, or the system may learn, that the user is highly health conscious and always chooses products with minimal fat content. Thus, the weights may be adjusted such that low fat products will be more likely to be selected as suitable products for the user.

In some embodiments, the user may indicate, or the system may learn, a user-specific cutoff priority criterion. For example, the user may indicate, or the system may learn, that the user is highly cost conscious, and never purchases any product costing more than a predetermined amount, for example $100. Thus, the weights may be adjusted such that mostly, and in some embodiments only, products costing less than $100 will be selected as suitable for the user.

In some embodiments, the user may provide an indication of the desired optimization aggressiveness level for the provided priorities. For example, the user may indicate that he wishes to save money, causing the system to increase the weight of the price feature, such that a product having a lower price would be selected as a suitable product for the user, even if it is not the most suitable product with respect to other features or priorities. Additionally, in some embodiments, additional substitute products are presented to the user in decreasing order of priority as defined by the user, or, in the example above, in increasing order of cost.

It is appreciated that the magnitude of the effect of each of the weights assigned to the features and of the product priorities may be determined per user. Similarly, the specific characteristics of the product which contribute to the weight based computation of similarity, and the specific characteristics of the product which contribute to the optimization based on the user's priorities are determined per user. As such, for some users, who always want to optimize for a given priority, optimization based on that priority will be favored even if it means that suggested substitutes are less similar to the desired product, while for other users, for whom similarity is more important, more similar products will be favored, and optimization based on user priorities will only take place when there are multiple products similar to the desired product.

As mentioned above, the user provides an initial identification of a desired product. In some embodiments, the initial identification provided by the user uniquely identifies the product. For example, the user may provide an identification of the Stock Keeping Unit (SKU) of the product, a Universal Product Code (UPC) of the product, or a barcode of the product. In such embodiments, the method step of uniquely identifying the desired product is obviated.

In some embodiments, the initial identification of the product provided by the user does not uniquely identify the product. For example, the user may provide a title of the desired product, a brand of the desired product, a description of the desired product, or an alias for the desired product, which do not uniquely identify the product.

In the context of the teachings herein, an alias of a product is a name users commonly use for the product, which is not the product's title or brand. For example, "dessert" may be an alias for a plurality of products.

In such embodiments, uniquely identifying the specific desired product intended by the user comprises using user-specific information and/or segment-specific information, identifying at least one suitable desired product which matches the title, brand, description and/or alias provided by the user, and computing a distance comprises computing a distance between the identified suitable desired products and other products in the title of the identified suitable desired products.

In some embodiments, uniquely identifying the specific desired product intended by the user comprises identifying groups of products which are purchased together, and identifying whether or not the user has purchased one or more of the products in the group within a predetermined duration. In some such embodiments, the products purchased together are identified in data aggregated from many users, for example from all users in the user-segment associated with the user. For example, the information learner may detect that in a certain percentage of the cases, people who purchased pasta sauce also purchase pasta within 60 days of the purchase of pasta sauce. Therefore, if the user had recently purchased pasta sauce, this information may be indicative and helpful in identifying a suitable desired product, for example of if the user gives as the initial identification a brand which includes pasta products and other products.

In some embodiments, each identified suitable desired product is assigned a confidence score, for example indicative of how likely it is that the identified suitable desired product is the desired product intended by the user, and how unlikely it is that the identified suitable desired product is not the desired product intended by the user. Thus, the confidence score is affected by how suitable the product is to the user, for example as determined using user-specific and segment-specific information, and by how many other products are equally, or substantially equally, suitable to the user.

In some embodiments, the confidence score is based on user-specific information learned over time and/or on the user's specific habits. For example, if the user provided the title "milk", and the user history shows that the user purchases skim milk once a month and whole milk once a week, the confidence scores given to skim milk and whole milk will depend on the last time the user purchased skim milk and the last time the user purchased whole milk.

As another example, if the user provided as the initial identification the title "milk", and the user purchases whole milk and soy milk regularly and at equal intervals, such that both are equally suitable for the user, the confidence score given to whole milk and to soy milk will be relatively low, as it is very difficult to "guess" which one the user had intended. If, on the other hand, the user purchases whole milk regularly and soy milk infrequently, such that soy milk is less likely to be purchased by the user and whole milk is more likely to be purchased by the user, whole milk will be given a higher confidence score, as it is the better "guess" of the user's intentions.

In some such embodiments, the suitable product for the user is associated with a confidence score based on the confidence score of the identified suitable desired product. In some embodiments, the confidence score and the user's choice of product for the given title are used to learn about the user's preferences and priorities, and to update the weights of the brand and/or of the features based on the learned preferences.

In some embodiments, the user provides the initial identification of the desired product vocally. In some such embodiments, the method also comprises analyzing the user's vocal command to identify at least one of a product title, a product description, a product brand, and a product alias, and using the identified title, description, brand, and/or alias to identify suitable products as described hereinabove.

In some embodiments, computing a distance between the specific desired product and other products in the specific title comprises computing a feature-distance score for each feature and a brand-distance score for the brand, and computing a weighted average of at least some of the brand-distance and feature-distance scores as the distance score.

In some embodiments, computing a distance comprises computing a parameter distance based on parameter scores for optimization priorities and optimization aggressiveness levels provided by the user, and computing a product relevance score based on the computed parameter distance scores and on a product similarity score.

In some embodiments, the method also comprises displaying to the user a representation of the at least one suitable product. In some embodiments, the representation of the at least one suitable product is displayed alongside a representation of the specific desired product. In some such embodiments, the representation comprises an image of the represented products. In some such embodiments, the representation comprises information, such as nutritional information, packaging information, or other information of the represented products.

The method described herein may be used for any of a plurality of applications. For example, the method may be used for converting a title based groceries list to a UPC specific groceries list, such as one used for ordering groceries online. As another example, the method may be used by an online vendor, who received a list of products to be purchased, to offer the user substitute products for products which are unavailable.

The method described herein may also be used to offer a price comparison service tailored to the characteristics of the user. For example, the system would maintain data about all the products carried by at least two supermarkets, including pricing data. The user would provide a groceries list, either including specific designations of the desired products, such as UPCs, or including titles, descriptions, brands, or aliases of the products. The system would then offer the user the total cost for all the products in the list in each of the supermarkets. In each supermarket, the products used for computing the total cost are selected from the products carried by that supermarket using the method described hereinabove based on the user-specific and segment-specific information. In some such embodiments, the system may also offer a few possible product lists with different prices based on different optimization aggressiveness levels of the optimized parameters.

The method may also be used to offer search term completion which is specifically suited to the searching user based on the user-specific and segment-specific information. For example, when the user begins typing a search term, the system may check for titles, brands, aliases, and product descriptions starting with the partial search term provided as input. The system may use the method described hereinabove to guess what are the most probable products for which the user intends to search, and displays those products for the user's selection. The system may also offer titles, aliases, and/or brands in addition to offering specific possible products.

For example once a user typed "Mi" the system may offer the following options—
Title—Milk
Brand—Milka
Products—Mint Tea, Low-fat Milk,
and the user may select a desired option. In cases in which the selected option is not a specific product but rather a title, brand, or alias, once the user has selected the desired option, he may be presented with a list of products within that option. In the example above, if the user selected the brand Milka, he will be presented with all the specific products of that brand.

The method may also be used to offer A-B testing optimization, in which the system looks for available products that are more suitable for the user based on his optimization priorities, and are similar enough to products the consumer is currently consuming. Once such a product is identified, it is provided to the consumer, possibly free of charge, possibly in a small quantity. The user may provide input regarding his satisfaction from the proposed product, or the system may automatically identify the user's satisfaction level based on the extent of purchasing of the proposed product following its proposal to the user. Based on the identified user consumption and satisfaction, the product may be included in the products likely to be purchased by the user, and the system may adapt so that the proposed product is identified as a desired product or as a suitable substitute in the method described herein.

In some cases, the system may automatically identify user consumption of the proposed product, for example using sensors that detect how quickly the product was consumed and/or if the package was thrown into the garbage empty or full.

Such testing optimization may also be supported by advertising, such that manufacturers can offer a sample of their products to users for whom the product may be suitable, particularly if the advertised product is more suitable based on the user's optimization priorities. In some cases, if the system identifies that a high enough percentage of consumers in a certain segment, or having similar optimization priorities, have switched to using the proposed product instead of a product they were previously using, it may adapt the product weights such that the new proposed product will be more likely to be offered to users of that segment or having those optimization priorities.

The method for identifying a suitable product for a user described herein may be carried out using any suitable device. That being said, according to an aspect of some embodiments of the invention there is provided a device for identifying a suitable product for a user, comprising:

a user input entry element configured to receive from a user an initial identification of a desired product having a specific title associated therewith; and a processor functionally associated with the user input entry element and comprising:

a product data accessor configured to access a product dataset comprising a group of products, the products being divided into subgroups according to title, wherein each product being associated with at least one of a brand and a set of features describing the product, wherein a weight is associated with the brand and with each feature;

a desired product identification module configured to use information in the product dataset and user-specific information to uniquely identify a specific desired product intended by the user in the initial identification a distance computation module configured to use at least some of the weights of the brand and of the features to compute a distance between the specific desired product and at least two other products in the specific title; and a suitable product identification module configured to identify at least one of the other products, having a small distance from the specific desired product, as a suitable product for the user.

The group of products may be any suitable group of products. That being said, in some embodiments the group of products comprises grocery products, electronics, books, pharmaceutical products, health care products, beauty care products, manufacturing products, agricultural products, games, gaming products, toys, clothing, shoes, entertainment products entertainment products such as plays, concerts, and movies, vehicles, such as cars, motorcycles, and yachts, and the like.

In some embodiments, the title comprises the natural name of a product. Exemplary titles may include, "milk", "fresh produce", "frozen vegetables", "children's books", "non-fiction books", and the like. Typically, each title has a plurality of products associated therewith. For example, fat free milk, low fat milk, whole milk, lactose free milk, and soy milk, are all associated with the title "milk".

In some embodiments, the brand relates to a manufacturer or distributor of the product. As such, in some embodiments, many products share a single brand. For example, the brand "Kit-Kat" may be associated with the products "Kit-Kat, 36-Count" and "KIT KAT CHUNKY Peanut Butter 48 g". In some embodiments, a single product may be associated with more than one brand, for example products associated with the brand "Kit-Kat" may also be associated with the brand "Nestle".

The features associated with a product may be any suitable features which describe the product, and may include, for example, flavor, nutritional identifications such as "diet", "low fat", "sugar free", "gluten free", and "lactose free", denominational identifications such as "vegetarian", "vegan", "Kosher", and "Halal", price, size of packaging, and the like. Typically, each feature is associated with a set of possible values which it may receive.

As described in further detail hereinbelow, in some embodiments, the weights associated with the brand and with the features of each product are user-specific.

In some embodiments, the user input entry element is configured to receive from the user-specific weights to be assigned to at least one feature and/or to the brand.

In some embodiments, the processor also comprises an information learner, functionally associated with a user information database and/or with the product dataset. In some embodiments the information learner is also functionally associated with the user input entry element. In some such embodiments, the information learner is configured to store the user's preferences as provided to the user input entry element, for example in the user information database.

In some such embodiments, the information learner is configured to learn the specific weights over time, for example based on choices the user makes after being offered the choice of two or more suitable products, or based on the user's product history. As an example, if the user's product history shows that when selecting a specific product the user is oblivious to the color of the product, the user-specific learner is configured to learn that the color of the specific product doesn't matter much to the user, and effects lowering of the weight of the "color" feature for that specific product, for a title associated with that specific product, or for all products in the dataset, with respect to the user.

Similarly, the user input entry element may receive from the user a specification, or the information learner may learn a filtering criterion for the user. For example, the user may specify that he is vegetarian, or the system may learn from the user's product history that the user only purchases vegetarian products, and may then increase the weight of the "vegetarian" feature so that vegetarian products are more likely to, and in some embodiments only vegetarian products will, be selected as suitable products for the user.

In some embodiments, the information learner is configured to learn the weights associated with the brand and with the features of each product based on a user-segment with which the user is associated. In some such embodiments, each user is associated with one or more user-segments, and information learner effects assignment of user-specific weights to the brand and/or to the features based on the user-segment with which the user is associated. For example, in the context of food products, the user may be associated with a segment of vegetarians, and suitable weights are assigned to the brand and to the features of products for users in that segment, for example giving a weight of zero for each product containing meat.

In some such embodiments, the information learner is configured to aggregate information relating to product history and substitute product selection history for all users in a segment, and to effect adjustment of the weights for the brand and/or for the features in the dataset with respect to the segment based on the aggregated information, in a form of crowd sourcing.

In some embodiments, the information learner is configured to automatically associate the user with one or more user-segments based on the learned user-specific information such as the user's purchase history, as known in the art.

In some embodiments, the processor is also configured to update the weights associated with the brand and features of each product based on market trends and/or on seasons. For example, during the winter, a higher weight may be given to a feature of "eaten hot", and a lower weight may be given to a feature of "eaten frozen".

As another example, during holiday seasons, the processor may increase the weight of holiday related features such as "contains chocolate mint", "suitable for holiday", "suitable for hosting", "elegant", and the like.

In some embodiments, the information learner automatically learns the seasonal effects for a user, a user-segment, or for the general population, and automatically sets the weights accordingly during the suitable season.

In some embodiments, the weights associated with the brand and with the features of each product are also determined based on the user's priorities. In some such embodiments, the processor is configured, for each specific user, to obtain user-specific product priorities, and to automatically adjust the weights of the brand and/or of the features based on the user-specific product priorities. Typically, product priorities relate to a category of products or features which should be given a higher or lower weight than that calculated based on the user-segment or user history, or which should override other features or products.

In some embodiments, the user input entry element is configured to receive from the user an indication of the user-specific product priorities. In some embodiments, the user information learning element is configured to automatically learn the user's product priorities over time, for example based on the user's product history or based on the substitute products selected by the user for a known desired product.

For example, the user may use the user input entry element to indicate, or the information learner may learn, that the user is highly health conscious and always selects products with minimal fat content. Thus, the weights may be adjusted such that low fat products will be more likely to be selected as suitable products for the user.

In some embodiments, the user may use the user input entry element to indicate, or the information learner may learn, a user cutoff priority criterion. For example, the user may use the user input entry element to indicate, or the information learner may learn, that the user is highly cost conscious, and never purchases any product costing more than a predetermined amount, for example $100. Thus, the weights may be adjusted such that mostly, and in some embodiments only, products costing less than $100 will be selected as suitable for the user.

In some embodiments, the user input entry element is configured to receive from the user an indication of the desired optimization aggressiveness level for the provided user-specific product priorities. For example, the user may indicate that he wishes to save money, causing the device to increase the weight of the price feature, such that a product having a lower price would be selected as a suitable product for the user over other products, even if it is not the most suitable product with respect to other features or priorities. Additionally, in some embodiments, additional substitute products are presented to the user in decreasing order of priority as defined by the user, or, in the example above, in increasing order of cost.

It is appreciated that the magnitude of the effect of each of the weights assigned to the features and of the product priorities may be determined per user, for example based on user specific information learned by the information learner. Similarly, the specific characteristics of the product which contribute to the weight based computation of similarity, and the specific characteristics of the product which contribute to the optimization based on the user's priorities are determined per user, for example based on user specific information learned by the information learner. As such, for some users, who always want to optimize for a given priority, optimization based on that priority will be favored even if it means that suggested substitutes are less similar to the desired product, while for other users, for whom similarity is more important, more similar products will be favored, and optimization based on user priorities will only take place when there are multiple products similar to the desired product.

The user input entry element may be any suitable user input entry element with which the user may interact to provide input to the device. That said, in some embodiments, the user input entry element comprises at least one of a keyboard, a touch screen, a computer mouse, a joystick, a microphone, and a port for connection to an input device such as a USB flash drive.

As mentioned above, the user input entry element is configured to receive an initial identification of a desired product. In some embodiments, the user input entry element is configured to receive as the initial identification information uniquely identifying the product. For example, the user may provide to the user input entry element as the initial identification a Stock Keeping Unit (SKU) of the desired product, a Universal Product Code (UPC) of the desired product, or a barcode of the desired product. In such embodiments, suitable product identification module may be obviated, or may remain idle.

In some embodiments, the user input entry element is configured to receive as the initial identification information which does not uniquely identify the product, for example, the user input entry element may receive from the user a title, a description, a brand, or an alias of the desired product.

In such embodiments, the desired product identification module is configured to "guess" the product intended by the user by using user-specific information and/or segment-specific information to identify at least one suitable desired product which matches the title, brand, description and/or alias received from the user. In such embodiments, the distance computation module is configured to compute the distance between the identified suitable desired products and other products in the title of the identified suitable desired products (or, when relevant, in the title received from the user).

In some embodiments, the desired product identification module is configured to uniquely identify the specific desired product intended by the user by identifying groups of products which are purchased together, and identifying whether or not the user has purchased one or more of the products in the group within a predetermined duration. In some such embodiments, the products purchased together are identified in data aggregated from many users, for example from all users in the user-segment associated with the user. For example, the information learner may detect that in a certain percentage of the cases, people who purchased pasta sauce also purchase pasta within 60 days of the purchase of pasta sauce. Therefore, if the user had recently purchased pasta sauce, this information may be indicative and helpful in identifying a suitable desired product, for example of if the user gives as the initial identification a brand which includes pasta products and other products.

In some embodiments, the desired product identification module assigns to each identified suitable desired product a confidence score, for example indicative of how likely it is that the identified suitable desired product is the desired product intended by the user, and how unlikely it is that the identified suitable desired product is not the desired product intended by the user. Thus, the confidence score is affected by how suitable the product is to the user, for example as determined using user-specific and segment-specific information, and by how many other products are equally, or substantially equally, suitable to the user.

In some embodiments, the desired product identification module is configured to assign confidence score based on user-specific information learned over time and/or on the user's specific habits, for example, as learned by the information learner. For example, if the user provided the title "milk", and the user history shows that the user purchases skim milk once a month and whole milk once a week, the confidence scores given to skim milk and whole milk will depend on the last time the user purchased skim milk and the last time the user purchased whole milk.

As another example, if the desired user provided as the initial identification the title "milk", and the user purchases whole milk and soy milk regularly and at equal intervals, such that both are equally suitable for the user, the confidence score assigned to whole milk and to soy milk will be relatively low, as it is very difficult to "guess" which one the user had intended. If, on the other hand, the user purchases whole milk regularly and soy milk infrequently, such that soy milk is less likely to be purchased by the user and whole milk is more likely to be purchased by the user, whole milk will be assigned a higher confidence score, as it is the better "guess" of the user's intentions.

In some such embodiments, the suitable product identification module is configured to associate a suitable product for the user with a confidence score based on the confidence score of the identified suitable desired product. In some embodiments, the information learner is configured to use the confidence score and the user's choice of product for the given title to learn about the user's preferences and priorities, and to effect updating of the weights of the brand and/or of the features based on the learned preferences.

In some embodiments, in which the user input entry element comprises a microphone configured to receive a vocal initial identification of the desired product, the processor also comprises a voice analysis component configured to analyze the user's vocal input to identify at least one of a product title, a product description, a product brand, and a product alias, which may be used by the processor to identify suitable products as described hereinabove.

In some embodiments, the distance computation module is configured to compute a brand-distance score for the brand and a feature-distance score for each feature, and to compute a weighted average of at least some of the brand-distance and feature-distance scores as the distance score. In some embodiments, the distance computation module is configured to use the computed distance score to compute a product similarity score for the desired product and the other product, and the suitable product identification module is configured to identify the suitable product based on the product similarity score.

In some embodiments, the distance computation module is configure to compute a parameter distance based on parameter scores for optimization priorities and optimization aggressiveness levels provided by the user, and to compute a product relevance score based on the computed parameter distance scores and on the product similarity score.

In some embodiments, the device also comprises a display functionally associated with the processor and/or with the user input entry element and configured to display to the user a representation of the at least one identified suitable product. In some embodiments, the display is also configured to display a representation of the desired product alongside the representation of the identified suitable product. In some embodiments, the representation comprises an image of the represented products. In some such embodiments, the representation comprises information, such as nutritional information, packaging information, or other information about the represented products.

Unless otherwise defined, all technical and scientific terms used herein have the same meaning as commonly understood by one of ordinary skill in the art to which the invention pertains. In case of conflict, the specification, including definitions, will take precedence.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

As used herein, the indefinite articles "a" and "an" mean "at least one" or "one or more" unless the context clearly dictates otherwise.

As used herein, when a numerical value is preceded by the term "about", the term "about" is intended to indicate +/−10%.

Embodiments of methods and/or devices of the invention may involve performing or completing selected tasks manually, automatically, or a combination thereof. Some embodiments of the invention are implemented with the use of components that comprise hardware, software, firmware or combinations thereof. In some embodiments, some components are general-purpose components such as general purpose computers or oscilloscopes. In some embodiments, some components are dedicated or custom components such as circuits, integrated circuits or software.

For example, in some embodiments, some of an embodiment is implemented as a plurality of software instructions executed by a data processor, for example which is part of a general-purpose or custom computer. In some embodiments, the data processor or computer comprises volatile memory for storing instructions and/or data and/or a non-volatile storage, for example, a magnetic hard-disk and/or removable media, for storing instructions and/or data. In some embodiments, implementation includes a network connection. In some embodiments, implementation includes a user interface, generally comprising one or more of input devices (e.g., allowing input of commands and/or parameters) and output devices (e.g., allowing reporting parameters of operation and results.

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures.

DESCRIPTION OF SOME EMBODIMENTS OF THE INVENTION

Figure 1:
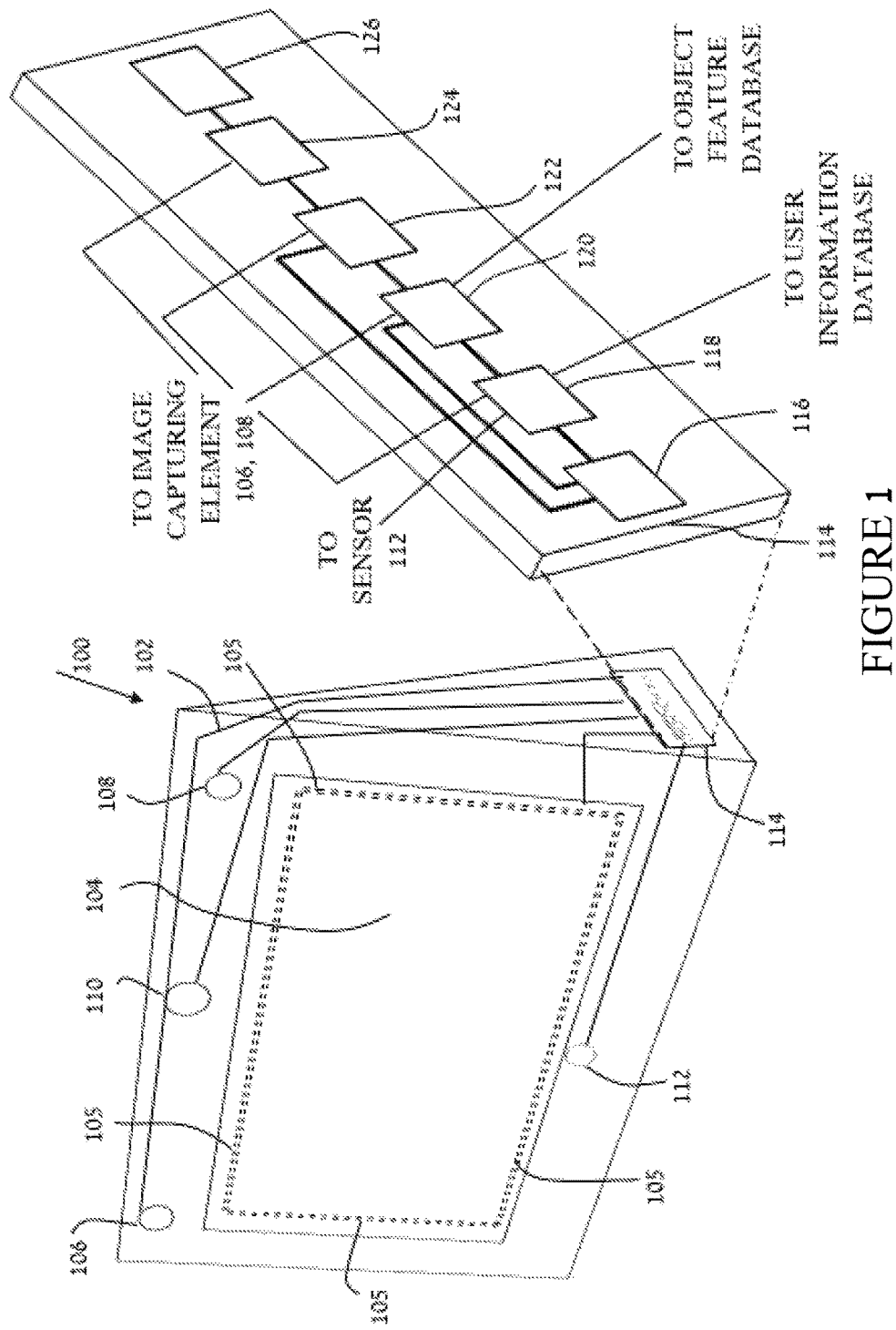
FIG. 1 is a schematic depiction of an embodiment of a device for creating and updating a list of objects according to an embodiment of the teachings herein, suitable for implementing methods of the teachings herein.

The invention, in some embodiments, relates to the field of retail shopping, and more particularly to methods and devices for improving the shopping experience of a user, both when shopping online and when shopping at a physical retail venue.

Specifically, some embodiments of the invention relate to smart, user friendly methods for creating and/or maintaining shopping or stocking lists.

Some embodiments of the invention relate to methods for creating and updating at least one of a list and a database, the method comprising:

triggering an image capturing element to capture at least one image of an object in a vicinity of the image capturing element;

analyzing the at least one image to identify features of the object;

uniquely identifying the object based at least on the identified features;

tracking motion of at least one of the object, another object, and a hand, to detect at least one user gesture;

interpreting the at least one detected user gesture at least based on user-specific information relating to gestures and preferences of a specific user to identify an action associated with the gesture, the action relating to at least one of an update to a list of objects and a change in a display associated with the list of objects; and based on the interpreting, carrying out the action, wherein the user-specific information is learned over time.

Some embodiments of the invention relate to devices for creating and updating a list or a database, the device comprising:

an information learner configured to learn user-specific information which relates to gestures and preferences of a specific user over time and to store the learned user-specific information;

a triggering module configured to identify a triggering event;

an image capturing element, functionally associated with the triggering module, and configured to be triggered by the triggering module, following identification of a the triggering event, to capture at least one image of an object in a vicinity of the image capturing element; and an object identifier functionally associated with the image capturing element and configured to analyze the at least one image captured by the image capturing element, to identify features of the object, and to uniquely identify the object based at least on the identified features;

a motion identifier configured to track motion of at least one of the object, another object, and a hand to detect at least one user gesture;

a gesture interpreter, functionally associated with the motion identifier and with the information learner, configured to interpret the at least one detected user gesture based at least on the user-specific information to identify an action associated with the gesture, the action relating to at least one of an update to a list of objects and a change in a display associated with the list of objects; and an action module functionally associated with the gesture interpreter and configured, based on the interpretation of the gesture interpreter, to carry out the action associated with the gesture.

The principles, uses and implementations of the teachings herein may be better understood with reference to the accompanying description and figures. Upon perusal of the description and figures present herein, one skilled in the art is able to implement the invention without undue effort or experimentation.

Before explaining at least one embodiment of the invention in detail, it is to be understood that the invention is not limited in its applications to the details of construction and the arrangement of the components and/or methods set forth in the following description and/or illustrated in the drawings and/or the Examples. The invention can be implemented with other embodiments and can be practiced or carried out in various ways. It is also understood that the phraseology and terminology employed herein is for descriptive purpose and should not be regarded as limiting.

Reference is now made to FIG. 1, which is a schematic depiction of an embodiment of a device 100 for creating and updating a list of objects according to an embodiment of the teachings herein, suitable for implementing methods of the teachings herein.

In the context of the present application, and specifically in the context of FIGS. 1-5B, an object may be any physical object, particularly one that can be held by a user. For example, the object may comprise a grocery product, a retail product such as a book, a CD, and a toy, a health product such as pharmaceuticals, cosmetic products, and beauty care products, or any marketable object, such as an image of a product or a coupon.

In some embodiments a device 100 for creating and updating a list of objects is custom-made to implement the teachings herein. In some embodiments, the device is a suitably-modified known device, for example, a stationary, mobile, or wearable computing device (cell phone, PDA, smartphone, mobile computer, tablet computer, desktop computer, augmented reality glasses, smart watch), typically only software-modified (not hardware-modified) allowing simple and advantageous implementation of the teachings herein with the use of a pre-existing and ubiquitous hardware infrastructure.

Typically, if device 100 is a stationary device, it is placed in a location convenient for maintaining a list of objects. For example, in some embodiments in which the list of objects created and maintained is a groceries list, device 100 may be placed in the kitchen or pantry, such as on a counter top or mounted onto a door such as a refrigerator door. As another example, in embodiments in which the list of objects is a stocking list for a retail venue, device 100 may be placed in the stock room of the venue.

As seen in FIG. 1, device 100 comprises an electronic device including a body portion 102 and a display 104 configured to display information to a user of device 100. Typically, display 104 is illuminated by backlighting illumination sources 105, which, in some embodiments, are disposed at multiple points along the circumference of display 104. As described in further detail hereinbelow, in some embodiments backlighting illumination sources 105 may be configured to illuminate an object in the vicinity of device 100. In some such embodiments, the illumination is controlled such that each of backlighting illumination sources 105 operates separately, illuminating the object from a different angle, as described hereinbelow. In some embodiments backlighting illumination sources 105 are configured to provide monochromatic illumination.

Disposed on body portion 102, typically on a forward facing portion thereof, is an image capturing element 106, configured to capture images of the vicinity of device 100. In some embodiments, an additional image capturing element 108 is also disposed on body portion 102, such that image capturing elements 106 and 108 may capture stereoscopic images representing the vicinity of device 100 in three dimensions. Image capturing element 106 and/or image capturing element 108 may be any suitable image capturing element, including a stills camera, a three dimensional camera, a video camera.

In some embodiments, at least one external illumination source 110 is disposed on body portion 102, typically on a forward facing portion thereof. Illumination source 110 may be any suitable illumination source which is configured to provide focused illumination to illuminate the vicinity of device 100. In some embodiments, illumination source 110 comprises at least one of an LED, a laser source or a source of structured light. In some embodiments, illumination source 110 emits light in at least one of the visible wavelengths, the infrared wavelengths, and ultraviolet wavelengths. In some embodiments, illumination source 110 is adapted to project a known illumination pattern onto the object.

In some embodiments, at least one sensor 112 is also disposed on body portion 102, typically on a forward facing portion thereof. Sensor 112 may include any suitable type of sensor.

In some embodiments, sensor 112 comprises a microphone configured to capture sounds in the vicinity of device 100. In some embodiments the microphone is associated with a sound-signal processor (not shown), which may be, for example, a software driver to the microphone, and which may be configured for speech recognition, as explained hereinbelow.

In some embodiments, sensor 112 comprises an RFID reader, configured to identify the presence of an RFID tag in the vicinity of device 100. In some embodiments, sensor 112 comprises a barcode reader, configured to identify the presence of a barcode in the vicinity of device 100. In some embodiments, sensor 112 comprises a Quick Response (QR) code reader configured to identify the presence of a QR code in the vicinity of device 100.

In some embodiments, sensor 112 comprises a proximity sensor configured to identify the presence of an object within a predetermined distance of, or radius around, device 100.

In some embodiments, sensor 112 comprises a motion sensor configured to identify motion of a user or of an object in the vicinity of device 100.

A processor 114 is functionally associated with image capturing elements 106 and 108, with illumination sources 105 and 110, and with one or more sensors 112. In some embodiments, processor 114 comprises an information learner 116, functionally associated with a user information database (not shown) and configured to learn user-specific information. Processor 114 further comprises a triggering module 118, functionally associated with information learner 116 as well as with image capturing elements 106 and 108 and with sensors 112.

An object identifier 120, forming part of processor 114, is functionally associated with an object feature database (not shown), with image capturing element 106 and 108, and in some embodiments with triggering module 118, and is configured to analyze images captured by the image capturing elements 106 and 108 and to identify an object in the images.

Processor 114 further comprises a motion identifier 122 functionally associated with object identifier 120 and with image capturing element 106 and 108, which is configured to track motion of an identified object.

Functionally associated with motion identifier 122 and with information learner 116 is a gesture interpreter 124, forming part of processor 114 and configured to interpret a user gesture causing the motion of the identified object and to identify an action associated with the gesture. Gesture interpreter 124 is functionally associated with an action module 126, which is configured to carry out the action identified by gesture interpreter 124 and to affect a suitable change on display 104.

Figure 2:
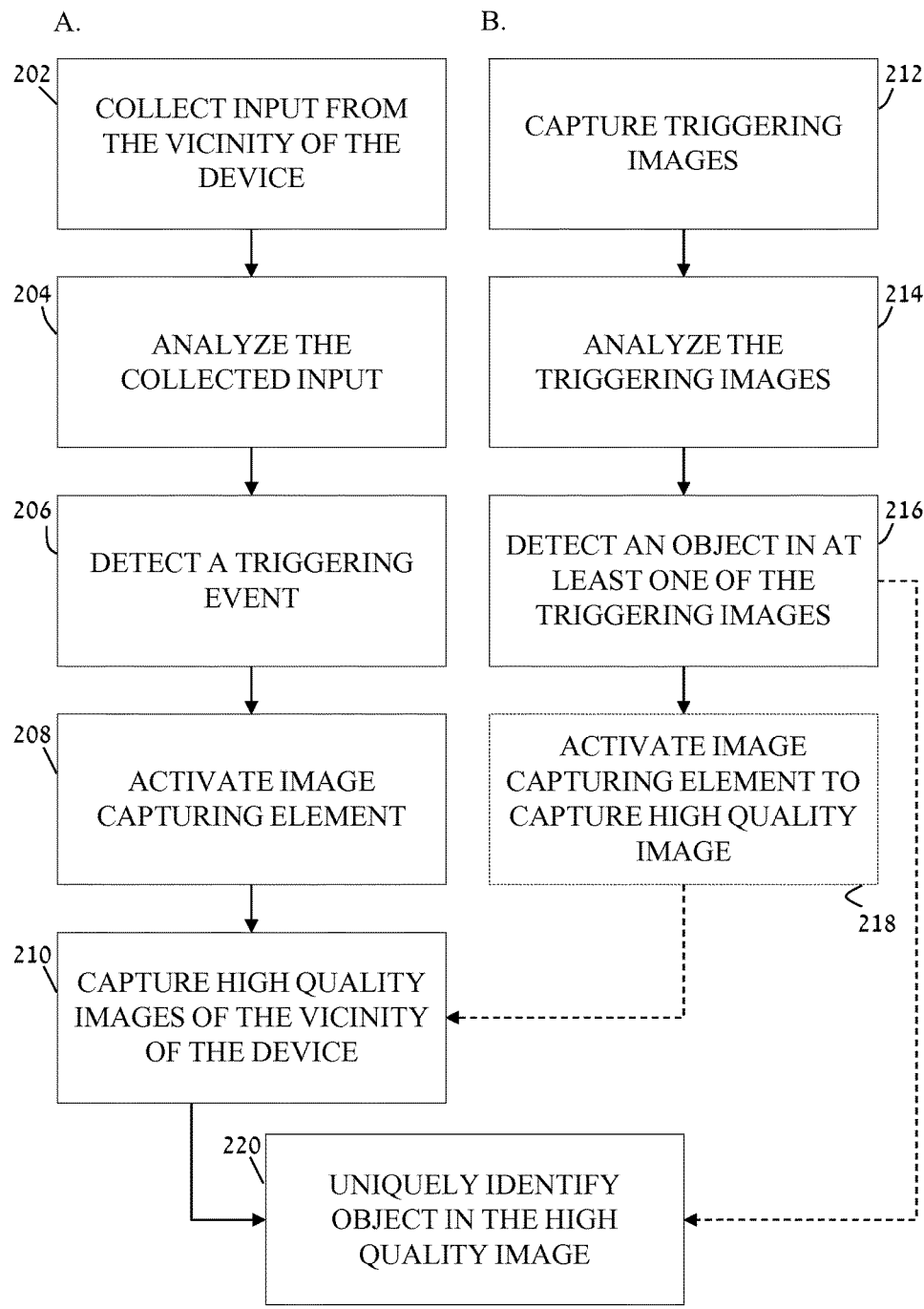
FIG. 2 is a flow chart of an embodiment of a method for triggering operation of a listing device, such as the device of FIG. 1, according to an embodiment of the teachings herein.

Reference is now additionally made to FIG. 2, which is a flow chart of an embodiment of a method for triggering operation of a listing device, such as device 100 of FIG. 1, according to an embodiment of the teachings herein.

In some embodiments, for use, device 100 is in a sleeping mode until operation thereof for creation or manipulation of a list, is triggered. While in the sleeping mode, device 100 may be used to operate any suitable form of software, such as to run applications, to display images, and the like. In other embodiments, for use, device 100 is active but at least one of its component elements, such as display 104, backlighting illumination sources 105, image capturing elements 106 and 108, illumination source 110, and processor modules 120 to 126, is in a sleeping mode until operation of the device is triggered. In some embodiments, databases associated with device 100 are only uploaded following triggering of the device.

Triggering module 118 of processor 114, communicates with image capturing elements 106 and/or 108 and/or with sensors 112 to identify a triggering event or the presence of an object in the vicinity of device 100. As explained hereinbelow, triggering can be carried out in multiple ways.

In some embodiments, as seen in step 202 of FIG. 2, one or more sensors 112 collect input from the vicinity of device 100, and provide the inputs to triggering module 118. Triggering module 118 analyzes the inputs provided by sensors 112 to detect a triggering event at step 204 of FIG. 2.

Once a triggering event is detected at step 206, triggering module 118 activates at least one of image capturing elements 106 and 108 at step 208, and the activated image capturing element captures at least one image of the vicinity of device 100 at step 210 of FIG. 2.

In some embodiments, when activating the image capturing elements 106 and/or 108, triggering module also interrupts a software program or application which was running on device 100 during the sleep mode, to enable the image capturing and processing as described hereinbelow.

The triggering event may be any suitable triggering event, which would indicate the presence of an object in the vicinity of device 100, such that a list of device 100 should be acted upon with respect to the object.

In some embodiments triggering module 118 detects a triggering event by detecting the presence of a user or an object within at a predetermined proximity to, or within a predetermined radius around, device 100, as identified in input collected by a proximity sensor 112. In some embodiments, a triggering event is only detected if the user or object is within the predetermined proximity or radius for a predetermined minimum time duration. In some embodiments, the predetermined proximity, predetermined radius, and predetermined minimum time duration are specific to each user and are provided to triggering module 118 by information learner 116, in some embodiments from the user information database.

In some embodiments triggering module 118 detects a triggering event by detecting the presence of a barcode in the vicinity of device 100, as identified in input collected by a barcode reader 112. In some embodiments, a triggering event is only detected if the barcode is in the vicinity of device 100 for a predetermined minimum time duration. In some embodiments, the predetermined minimum time duration is specific to each user and is provided to triggering module 118 by information learner 116, in some embodiments from the user information database.

In some embodiments triggering module 118 detects a triggering event by detecting the presence of a QR code in the vicinity of device 100, as identified in input collected by a QR code reader 112. In some embodiments, a triggering event is only detected if the QR code is in the vicinity of device 100 for a predetermined minimum time duration. In some embodiments, the predetermined minimum time duration is specific to each user and is provided to triggering module 118 by information learner 116, in some embodiments from the user information database.

In some embodiments triggering module 118 detects a triggering event by detecting the presence of an RFID tag in the vicinity of device 100, as identified in input collected by an RFID sensor 112. In some embodiments, a triggering event is only detected if the RFID tag is in the vicinity of device 100 for a predetermined minimum time duration. In some embodiments, the predetermined minimum time duration is specific to each user and is provided to triggering module 118 by information learner 116, in some embodiments from the user information database.

In some embodiments, triggering module 118 detects a triggering event by detecting motion in the vicinity of the device 100, as identified in input collected by motion sensor 112. In some embodiments, triggering module 118 detects a triggering event by detecting a specific motion pattern in the vicinity of device 100. In some embodiments, the specific motion pattern is user-specific and is provided to triggering module 118 by information learner 116, in some embodiments from the user information database.

In some embodiments, triggering module 118 detects a triggering event by detecting a triggering command voiced in the vicinity of the device 100, as identified in input collected by a microphone or other voice sensor 112. The command may be any suitable command, and typically includes one or more specific words or phrases. In some embodiments, triggering module 118 is configured to communicate with information learner 116 to identify user-specific pronunciation or diction of the command.

In some embodiments, triggering module 118 is configured to detect an object in the vicinity of device 100, and thereafter to trigger image capturing elements 106 and 108.

In some embodiments, as seen in step 212 of FIG. 2, one both of image capturing elements 106 and 108 capture triggering images of the vicinity of device 100 at a trigger imaging rate. The trigger imaging rate may be any suitable imaging rate. That being said, in some embodiments the trigger imaging rate is not more than 10 images per second, not more than 5 images per second, not more than 2 images per second, or not more than one image per second, so as to conserve energy while a product is not in the vicinity of device 100.

At step 214 triggering module 118 analyzes the triggering images captured by image capturing elements 106 and/or 108. In some embodiments, the analysis results in detection of a triggering event, at step 206, and in some embodiments the analysis results in detection of the presence of an object as seen at step 216 of FIG. 2.

In some embodiments, in order to conserve energy and other resources, image capturing elements 106 and/or 108 capture poor quality images as the triggering images, such as images having low resolution, images which are out of focus, or black and white images. In such embodiments, following detection of an object in the triggering images, triggering module 118 activates at least one of image capturing elements 106 and 108 to capture a high quality image at step 218, and the activated image capturing element captures at least one high quality image of the vicinity of device 100 at step 210.

Following capturing of high quality images at step 210, or, in embodiments in which the triggering images are high quality images, following detection of an object in the triggering images at step 216, the captured images are processed by object identifier 120 so as to uniquely identify an object present in the images at step 220. It is appreciated that in the context of the teachings herein a high quality image is an image in which the object can be clearly and uniquely identified using automatic means, as described hereinbelow, and need not necessarily be a color image or an image having a specific resolution.

In some embodiments, triggering module 118 is configured to detect an object in the triggering images (at step 216) by identifying a boundary of an object therein. In some embodiments, triggering module 118 is also configured to eliminate background information from the triggering images prior to identifying the boundary.

In some embodiments, triggering module 118 is configured to detect at least one visual feature of the object in the triggering images (at step 216). The visual feature may be any suitable visual feature. That being said, in some embodiments the visual feature comprises at least one of the presence of writing on the object, the presence of graphics on the object, coloring of the object, the presence of watermarks on the object, and the three dimensional structure of the object.

In some embodiments, triggering module 118 is configured to detect a triggering event (at step 206) by comparing at least two of the triggering images to identify motion of the object in the vicinity device 100. In some embodiments, triggering module 118 detects a triggering event by detecting a specific motion pattern in the vicinity of device 100. In some embodiments, the specific motion pattern is user-specific and is provided to triggering module 118 by information learner 116, in some embodiments from the user information database.

In some embodiments, triggering module 118 is configured to detect a triggering event (at step 206) by comparing at least two of the triggering images to identify a change in the object in the vicinity device 100, for example due to the fact that the user put down one object and picked up another.

In some embodiments, during image capturing at step 210 and/or at step 212, illumination source 110 illuminates the vicinity of device 100.

In some embodiments, during image capturing at step 210 and/or at step 212 the vicinity of device 100 is illuminated by display backlighting 105. In some embodiments, the display backlighting 105 is configured to illuminate the vicinity of the device 100 including the object in controlled fashion so as to illuminate the object from different angles, thereby to generate different shadow patterns in different images captured by the image capturing elements 106 and 108.

In some embodiments, illumination source 110 and/or display backlighting 105 provide monochromatic illumination during image capturing. In some such embodiments, the monochromatic illumination is patterned monochromatic illumination. For example, the object may initially be illuminated with blue light, subsequently be illuminated with green light, and finally be illuminated with red light. In some embodiments, illumination source 110 and/or display backlighting 105 provide illumination in at least one of the visible wavelength range, the infrared wavelength range, and the ultraviolet wavelength range during image capturing. In some embodiments, illumination source 110 projects onto the object a known illumination pattern, also termed structured light, thereby enabling identification of the three dimensional structure of the object.

As mentioned above, at step 220 of FIG. 2 object identifier 120 uniquely identifies the object present in the image or images captured by the image capturing elements 106 and/or 108.

In some embodiments, object identifier 120 identifies visual features of the object in the captured images. In some embodiments, object identifier 120 virtually combines a plurality of images of the object and identifies the visual features in the virtually combined image. For example, a three dimensional structure of the object may be identified in stereoscopic images captured by image capturing elements 106 and 108.

In some embodiments, object identifier 120 identifies one or more of an image printed on the object, coloring of the object, text or lettering printed on the object, watermarks on the object, and any other graphic forms present on the object, both visible to the human eye and invisible thereto.

In some embodiments, object identifier 120 identifies unique object characteristics in the captured images. In some such embodiments object identifier 120 identifies at least one of a barcode and a unique QR code of the object.

In some embodiments, object identifier 120 identifies a three dimensional structure of the object in the captured images, for example by combining stereoscopic images of the object. In some such embodiments, object identifier 120 uses shadow patterns in the images, for example caused by illumination of the object from different angles during image capturing, to identify the three dimensional structure of the object.

Once object identifier 120 has identified a suitable number of characteristics and features of the object, it accesses an object-feature database (not shown) and finds in the database the identity of the object based on at least some of, and typically all of, the identified characteristics and features.

In some embodiments, for example if the identified characteristics and features of the object are not sufficient for uniquely identifying the object, object identifier 120 uses additional information sources in order to uniquely identify the object.

In some embodiments, object identifier 120 uses user-specific information learned by information learner 116. For example, the user-specific information may indicate that the user holds heavy objects at a specific angle. Upon identification of the angle at which the user is holding the object, object identifier 120 may be able to narrow the possible identifications of the object to heavy objects.

In some embodiments, each user is associated with at least one user-segment, which user-segment is typically learned over time by information learner 116. For example, in the context of objects comprising groceries, a user may be associated with a segment of vegetarians, a segment of users who eat kosher, or a segment of users who refrain from gluten. In some embodiments, object identifier 120 uses information relating to the user-segment of the specific user in order to better identify the object. For example, if the user is associated with a segment of users who refrain from gluten, object identifier may be able to narrow the possible identifications of the object to objects that do not contain gluten.

In some embodiments, device 100 also comprises an input entry element (not shown), such as a mouse, a keyboard, a touchscreen, and a joystick, for receiving input from a user. In some such embodiments, object identifier 120 uses information provided by the user to uniquely and accurately identify the object. For example, if using all the methods described above object identifier 120 had narrowed down the possible objects to few objects, the objects may be presented to the user on display 104 and the user may then use the input entry element to select which of the presented objects he is holding. In some such embodiments, the information learner 116 learns from the input provided by the user additional characteristics of the user to be included in the user-specific information, such as adding the object to the user's object history.

In some embodiments, following unique identification of the object based on user input or on user-specific information, object identifier 120 updates the entry for the object in the object-feature database. For example, if object identifier 120 required user input in order to uniquely identify a grocery product because of a change in the product packaging, object identifier 120 may update the database with features of the new packaging and/or with an image of the new packaging.

Figure 3A:
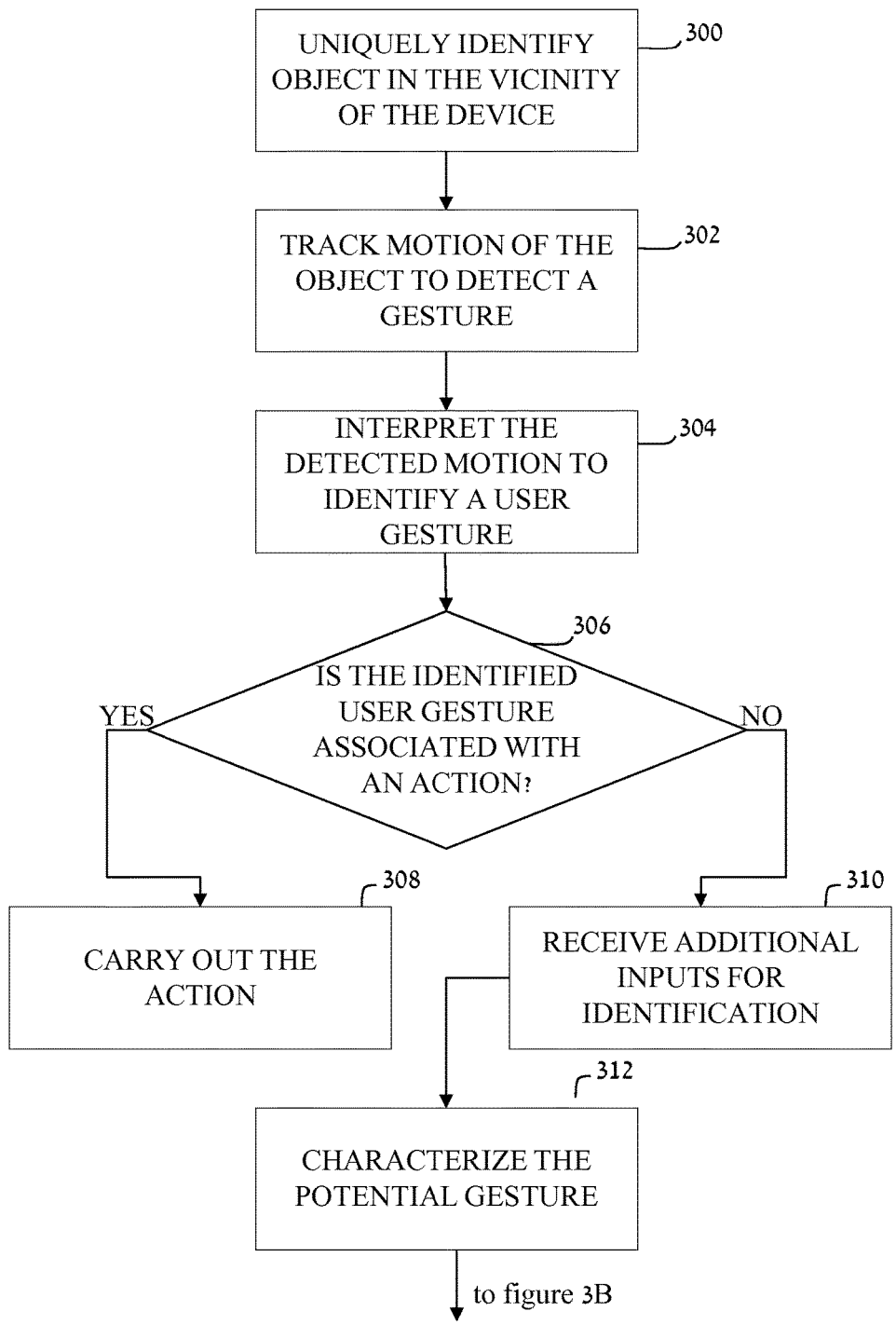
FIGS. 3A and 3B, taken together, are a flow chart of an embodiment of a method for updating a list based on user gestures and for learning user-specific information according to an embodiment of the teachings herein.
Figure 3B:
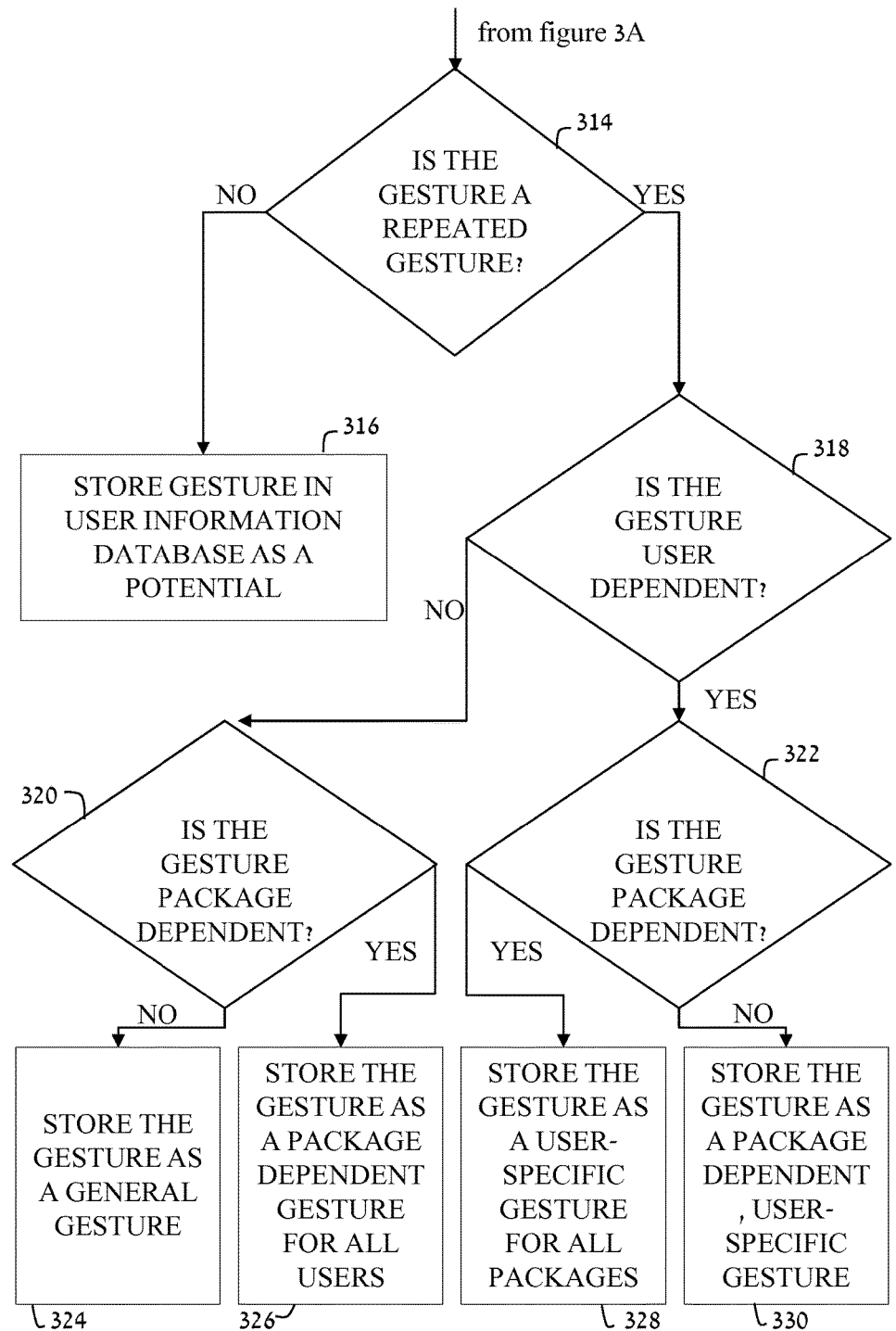

Reference is now made to FIGS. 3A and 3B, which, taken together, are a flow chart of an embodiment of a method for updating a list based on user gestures and for learning user-specific information according to an embodiment of the teachings herein.

As seen at step 300 of FIG. 3A, and as described hereinabove with reference to step 220 of FIG. 2, object identifier 120 identifies an object in the vicinity of device 100. Subsequently, motion identifier 122 tracks a trajectory of motion of the identified object at step 302 to detect a gesture causing the motion. In some embodiments, motion identifier 122 is functionally associated with the object-feature database, and may use the unique identification of the object provided by object identifier 120 to extract from the object-feature database a three dimensional structure of the object. The three dimensional structure may then be used by motion identifier 122 to track the object in at least two images captured by the image capturing elements 106 and/or 108 to detect a trajectory of motion of the object.

As discussed hereinbelow with reference to FIGS. 4A and 4B, once the object is identified by object identifier 120, is it typically rendered on display 104 for the user to be able to see the identified object. In some embodiments the display includes an image of the identified object. In some embodiments the display includes a virtual three-dimensional model of the object.

Motion identifier 122 provides the detected motion trajectory to gesture interpreter 124, which, at step 304, tries to interpret the user gesture associated with the detected motion in order to identify an action associated with the motion, as described hereinbelow with reference to FIGS. 4A and 4B. Interpretation of the user gesture is based at least on user-specific information provided by information learner 116, such that a user-specific gesture may be correctly interpreted. For example, if the gesture comprises tilting the object sideways, the angle at which the object is tilted may be user-specific, such that gesture interpreter 124 would take the user-specific tilt angle into consideration when interpreting the gesture to identify an action associated therewith.

In some embodiments, gesture interpreter 124 uses the user-specific information as well as information relating to one or more form-feature of the object, such as weight, size, and three dimensional shape as recorded in the object-feature database, to identify a user-specific gesture associated with a specific action corresponding to the detected trajectory of motion. For example, for a given user, the interpretation of the same gesture may be different if the user is holding a heavy object or if the user is holding a light object. Therefore, gesture interpreter 124 takes the weight of the object into consideration when interpreting the action associated with the gesture.

If, at step 306, gesture interpreter 124 succeeded in identifying an action associated with the user gesture for the specific user, action module 126 carries out the identified action with respect to the uniquely identified object, at step 308.

The action associated with the user gesture and carried out by action module 126 may be any suitable action. That being said, in some embodiments, the action relates to a list and comprises at least one of:

adding a specific number of occurrences of the object to the list;

removing a specific number of occurrences of the object from the list;

displaying at least one object that can be used as a substitute for the uniquely identified object;

displaying information relating to the identified object;

displaying the list;

replacing the object by a substitute object in the list;

searching the object-feature database for a specific object;

searching the object-feature database for an object which is similar to the identified object;

filtering the list by a suitable criterion, such as by product feature;

sorting the list according to a suitable order, such as popularity, relevance, size, location in a store, and the like;

displaying a subset of products, for example only products that have previously been purchased by the user; and requesting help or support.

In some embodiments, each action type is associated with a different user gesture. In some embodiments, for a specific user, each user gesture is associated with a single action type.

In some embodiments, a representation of the action is presented on display 104 for the user to know what action was carried out, as described in further detail hereinbelow with reference to FIGS. 4A and 4B.

In some embodiments, the object comprises a single unit of a multi-unit object packaging, such as a single, individually wrapped, biscuit forming part of a 50 biscuit package. In such embodiments, object identifier 124 is configured to use the unique identification of the single unit object, or in the example above, the individually wrapped biscuit, to uniquely identify the multi-unit object packaging associated with the object, or, in the example above, the 50 biscuit package. In some such embodiments, action module 126 is configured to carry out the action identified by gesture interpreter 124 with respect to the multi-unit object packaging, even though the identified object was the single unit object.

In some embodiments, particularly in embodiments in which the multi-unit object is not uniquely identified, object identifier 124 analyzes the user's object purchase history and/or the user-specific information (for example learned by information learner 116) and selects as the multi-unit object one of a plurality of multi-unit objects having the highest confidence score with respect to the user and to the single unit object. For example, if the single unit object may be purchased in a 25 unit package or in a 50 unit package, object identifier 124 may access the user's purchase history and see which type of multi-unit package the user typically buys, and may give a higher confidence score to the package type more frequently bought by the user.

In some embodiments, the user may provide a vocal command to device 100 rather than providing a gesture command. For example, the user may hold an object and say "add three", indicating that three occurrences of the object should be added to the list. In such embodiments, the vocal command is captured by sound sensor 112 of device 100, and is interpreted by a voice interpreter (not shown) to identify the action associated with the provided command. The action identified by the voice interpreter is then carried out by action module 126 as described hereinabove for a gesture based action. In some embodiments, interpretation of the vocal command by the voice interpreter is user-specific and is based on user-specific information provided by information learner 116. For example, interpretation of the vocal command may take into consideration the user's accent and diction.

As another example, the user may not be holding the object for which the action should be carried out, but includes an identification of the object in the vocal command. For example, the user may say "add whole milk", indicating that whole milk should be added to the list. In such embodiments, the voice interpreter uses the method described hereinbelow with respect to FIG. 7 in order to uniquely identify the object intended by the user, in addition to identifying the action to be associated with the object.

If, at step 306, the gesture interpreter 124 does not succeed in identifying an action associated with the identified motion for the user based on existing user information, at step 310 gesture identifier 124 receives additional inputs for assisting in identification of the gesture or in identification of an action to be associated with the gesture. In some embodiments the additional inputs relate to the object, and for example may include a barcode reading from the object, text appearing on the object as identified by an Optical Character Reader (OCR), and the like.

In some embodiments, the additional input may be provided by the user, such as by the user providing a vocal command corresponding to the unidentified gesture, or by the user interacting with display 104 to select a desired action to be carried out. In some embodiments, the additional inputs may be segment-specific inputs related to a segment to which the user belongs. For example, if the user belongs to a segment of elderly people, the gesture may be better identified based on characteristics of the segment. Once additional input is received, gesture interpreter 124 characterizes the unidentified gesture, now considered to be a potential user gesture, at step 312. In some embodiments the gesture identifier 124 characterizes the trajectory, or pattern, of motion when performing the gesture, the angles at which the gesture is performed, the motion velocity of the gesture, the acceleration pattern of the gesture, and/or the distances of motion when performing the gesture. In some embodiments, gesture interpreter 124 is configured to interpret, characterize, or identify, also only part of the gesture, for example if part of the gesture is carried out outside the frame of the image capturing device 106. In some embodiments gesture interpreter 124 also characterizes the user while performing the gesture. For example, gesture interpreter 124 may identify the positions and/or angles between body parts while the user is performing the gesture. In some embodiments gesture identifier 124 may ignore gestures which typically do not imply any sort of action, such as returning the hand to its original position after performing an action-related gesture.

It is appreciated that at times the user does not intend to perform any specific gesture, but the user's motion is tracked by motion identifier 122 and is interpreted by gesture interpreter 124. In order to determine whether the characterized unidentified gesture was an intentional gesture trying to provide a command to device 100, or an unintentional gesture, gesture identifier 124 checks to see whether the gesture is a repeated gesture at step 314 of FIG. 3B.

In some embodiments the gesture is considered a repeated gesture if the user repeats the gesture shortly after initial detection of the gesture at step 304, so that the user is still seeking for device 100 to carry out an action at the same setting. In some embodiments, the gesture is considered a repeated gesture if it has previously been used by the user, and was saved by gesture interpreter 124 and/or by information learner 116 as a potential gesture. In some such embodiments, the gesture is considered a repeated gesture only if it has been repeated a predetermined number of times, for example three or four times.

If the gesture is not considered a repeated gesture, at step 316 information learner 116 stores the gesture and/or gesture characteristics in the user information database as a potential gesture. The potential gesture may be used in the future to determine whether another unidentified gesture is a repeated gesture.

If, on the other hand, at step 314 the gesture is considered a repeated gesture, at step 318 gesture interpreter 124 analyzes the repeated gesture to determine whether or not the gesture is user dependent. Regardless of whether or not the gesture is user dependent, gesture interpreter 124 also analyzes the repeated gesture to determine whether or not the gesture is package dependent, at steps 320 and 322.

It is appreciated that step 320 and/or step 322 may be carried out before carrying out step 318. It is further appreciated that step 320 and/or step 322 may be obviated, such that the method only identifies if the gesture is user dependent. Similarly it is appreciated that step 318 may be obviated, such that the method only identifies if the gesture is package dependent.

If gesture interpreter 124 determines that the gesture is not user dependent and is not package dependent, gesture interpreter 124 stores the gesture as a general gesture at step 324. In some embodiments, the stored gesture may be used for interpretation of user gestures regardless of the identity of the user or of the shape and structure of the package of the object used for gesturing.

In some embodiments, multiple users use the same device 100, for example multiple family members may use a device 100 located in the family's kitchen. In some such embodiments, device 100 includes a user recognition module (not shown) for uniquely identifying the specific user, or family member, using the device. The user recognition module may be any suitable module, such as a voice recognition module, a face recognition module, a fingerprint scanner, an iris scanner, and the like. In embodiments in which device 100 does not include a user recognition module, gesture interpreter 124 and/or information learner 116 may learn and store a repertoire of user gestures, each specific to at least one user of a specific device. If gesture interpreter 124 determines that the gesture is not user dependent but is package dependent, gesture interpreter 124 stores the gesture as a package dependent gesture for all users at step 326. In some embodiments, the stored gesture may be used for interpretation of user gestures for objects having a similar type of packaging, for example in terms of size, shape, and weight, regardless of the identity of the user holding the object and performing the gesture.

If gesture interpreter 124 determines that the gesture is user dependent but is not package dependent, gesture interpreter 124 stores the gesture as a user-specific gesture for all types of packages at step 328. In some embodiments, information learner 116 stores the gesture as specific to the user in the user information database. In some embodiments, the stored gesture may be used for interpretation of user gestures of the specific user, regardless of the object used for performing the gesture.

If gesture interpreter 124 determines that the gesture is user dependent and package dependent, gesture interpreter 124 stores the gesture as a user-specific package dependent gesture at step 330. In some embodiments, information learner 116 stores the gesture as specific to the user and to the package type in the user information database. In some embodiments, the stored gesture may be used for interpretation of user gestures of the specific user when holding objects having a similar type of packaging, for example in terms of size, shape, and weight.

Figure 4A:
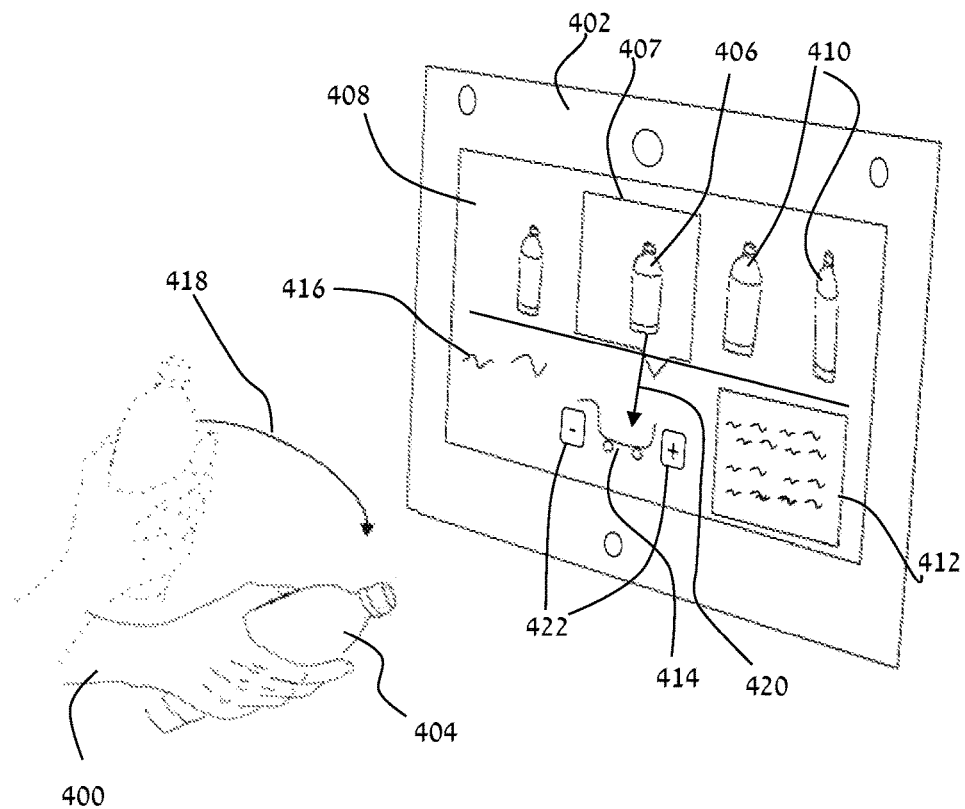
FIGS. 4A and 4B are schematic pictorial illustrations of embodiments for carrying out an action on a list based on user gestures according to embodiments of the teachings herein.
Figure 4B:
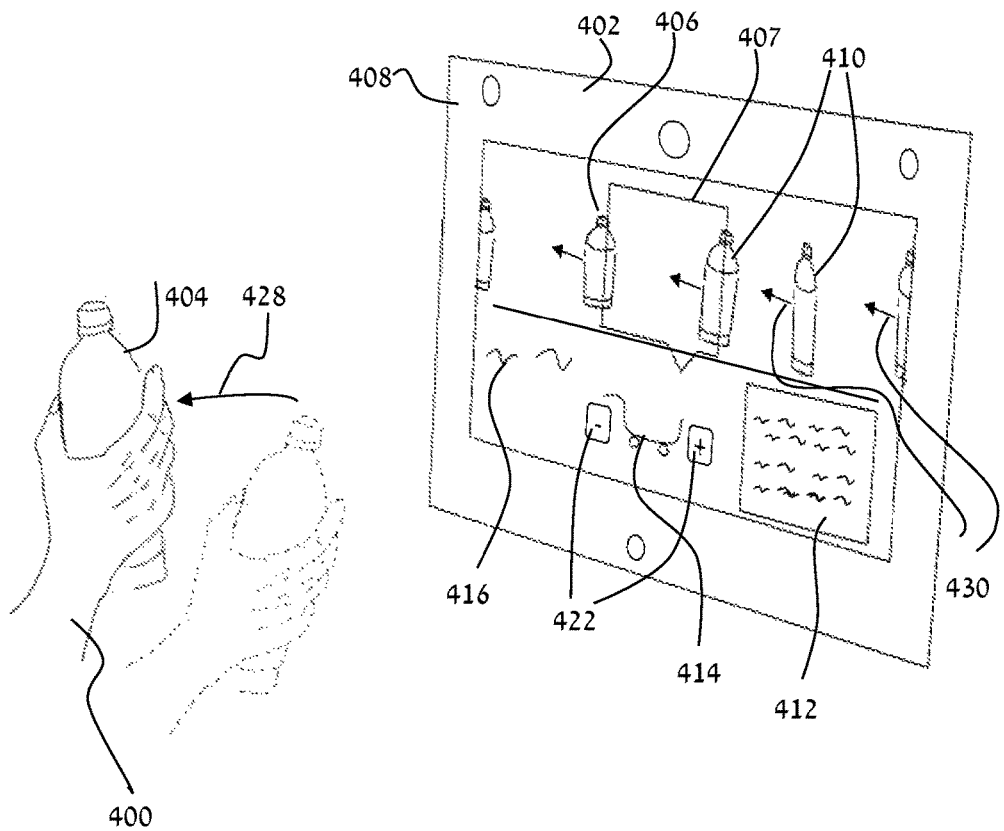

Reference is now made to FIGS. 4A and 4B, which are schematic pictorial illustrations of embodiments for carrying out an action on a list based on user gestures according to embodiments of the teachings herein. In the illustrated embodiments FIG. 4A represents an action of addition of an object into a list, and FIG. 4B represents an action of selecting a substitute object.

As seen in FIGS. 4A and 4B, the hand 400 of a user (not shown), standing in front of a device 402, similar to device 100 of FIG. 1, is holding an object 404, which, in the illustrated embodiment, comprises a soda bottle. Following identification of the object 404 as a soda bottle, as described hereinabove, an image or model 406 of the soda bottle is presented within a frame 407 at the center top portion of a display 408 of device 402, similar to display 104 of FIG. 1. Typically, the object contained in frame 407 is the selected object which is used for further processing and gesture identification. In some embodiments, alongside the image or model 406 of the identified soda bottle are presented images or models 410 of objects which were identified by device 402 to be similar to the object 404 held by the user and/or which may be used as a substitute for object 404, for example as described hereinbelow with reference to FIGS. 6 to 8.

Typically, details of the identified object are provided on a lower portion of display 408, as seen at reference numeral 412. In some embodiments, particularly in embodiments pertaining to grocery lists, shopping lists, or stocking lists, a shopping cart 414 is presented on the lower portion of display 408. In some embodiments, the current list of objects 416, such as a shopping list or stocking list, is also displayed on the lower portion of display 408.

Referring specifically to FIG. 4A, the user wishes to add the object 404 to list 416. As seen, the user tilts his hand 400 and object 404 held therein to the right, as indicated by arrow 418. The user's tilt gesture is identified as described hereinabove with reference to FIGS. 3A and 3B, and is interpreted by the gesture interpreter to mean a specific action, which, in the illustrated embodiment, comprises adding the object 404 to the shopping list 416. When the action is carried out, such as by an action module of device 402 as described hereinabove, display 408 presents a representation of the action, which in some embodiments comprises an animation of inserting the image 406 of the object into the shopping cart 414 as indicated by arrow 420, and simultaneously or thereafter updating the displayed list 416.

In some embodiments, a Graphical User Interface (GUI) 422 is also provided on display 408. In some embodiments, the user may interact with GUI 422, for example in order to increase the number of units of object 404 added to the list or to decrease the number of units of object 404 added to the list. In the illustrated embodiment, display 408 comprises a touch screen, such that the user may interact with GUI 422 by touching a desired element of the GUI. However, it is appreciated that the user may interact with GUI 422 in any suitable manner, such as by using a mouse, a keyboard, a joystick or the like.

Turning to FIG. 4B, the user wishes to select a substitute displayed object 410 for further processing, for example because the object 404 was incorrectly identified as displayed object 406 and the user is actually holding one of displayed objects 410, or because the user identifies a substitute object that would be more suitable for his needs or wishes. As seen, the user moves his hand 400 and object 404 held therein horizontally to the left, as indicated by arrow 428. The leftward gesture is identified as described hereinabove with reference to FIGS. 3A and 3B, and is interpreted by the gesture interpreter to mean a specific action, which, in the illustrated embodiment, comprises moving the displayed objects 406 and 410 to the left as indicated by arrows 430, such that one of objects 410 is now surrounded by frame 407 and is selected for further processing and/or for carrying out of further actions. In some embodiments, once a new object is selected to be in frame 407, presented details 412 are updated to correspond to the newly selected object.

As mentioned above, in some embodiments display 408 comprises a touch screen, such that the user may alternately select a specific object 410 by touching the image of the object on display 408, thereby causing animated motion of the displayed objects until the selected object is displayed in frame 407.

Typically, a suitable animation or visual representation is provided on display 408 when an action is carried out by device 100, as shown in the examples of FIGS. 4A and 4B.

It is appreciated that the embodiments illustrated in FIGS. 4A and 4B are provided for the sake of example only, and that any suitable motion may be associated with any suitable action as described hereinabove with reference to FIGS. 3A and 3B. It is further appreciated that the user interface illustrated in FIGS. 4A and 4B is provided for the sake of example only, and that any suitable user interface may be provided.

Figure 5A:
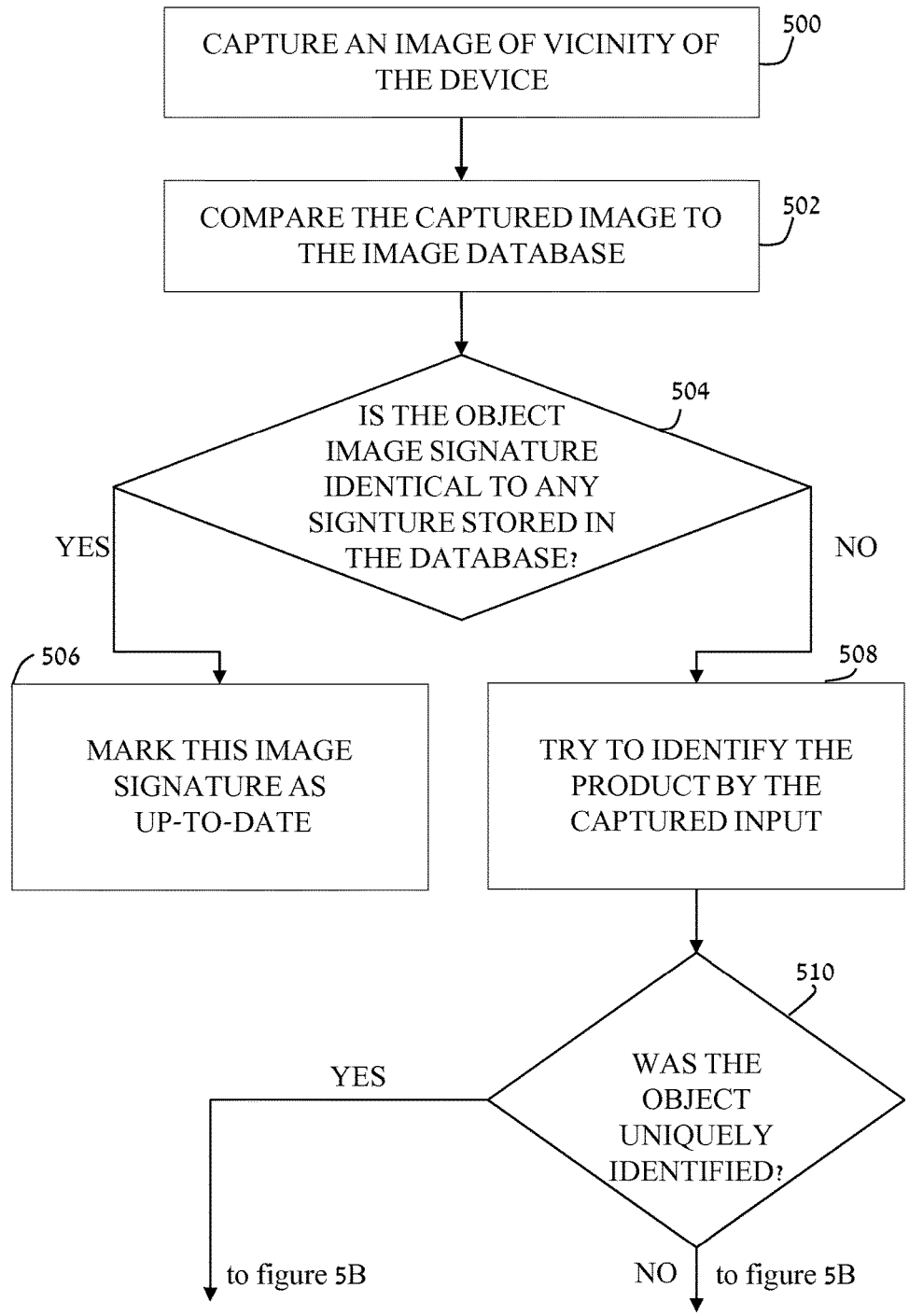
FIGS. 5A and 5B, taken together, are a flow chart of an embodiment of a method for updating an object-feature database according to an embodiment of the teachings herein.
Figure 5B:
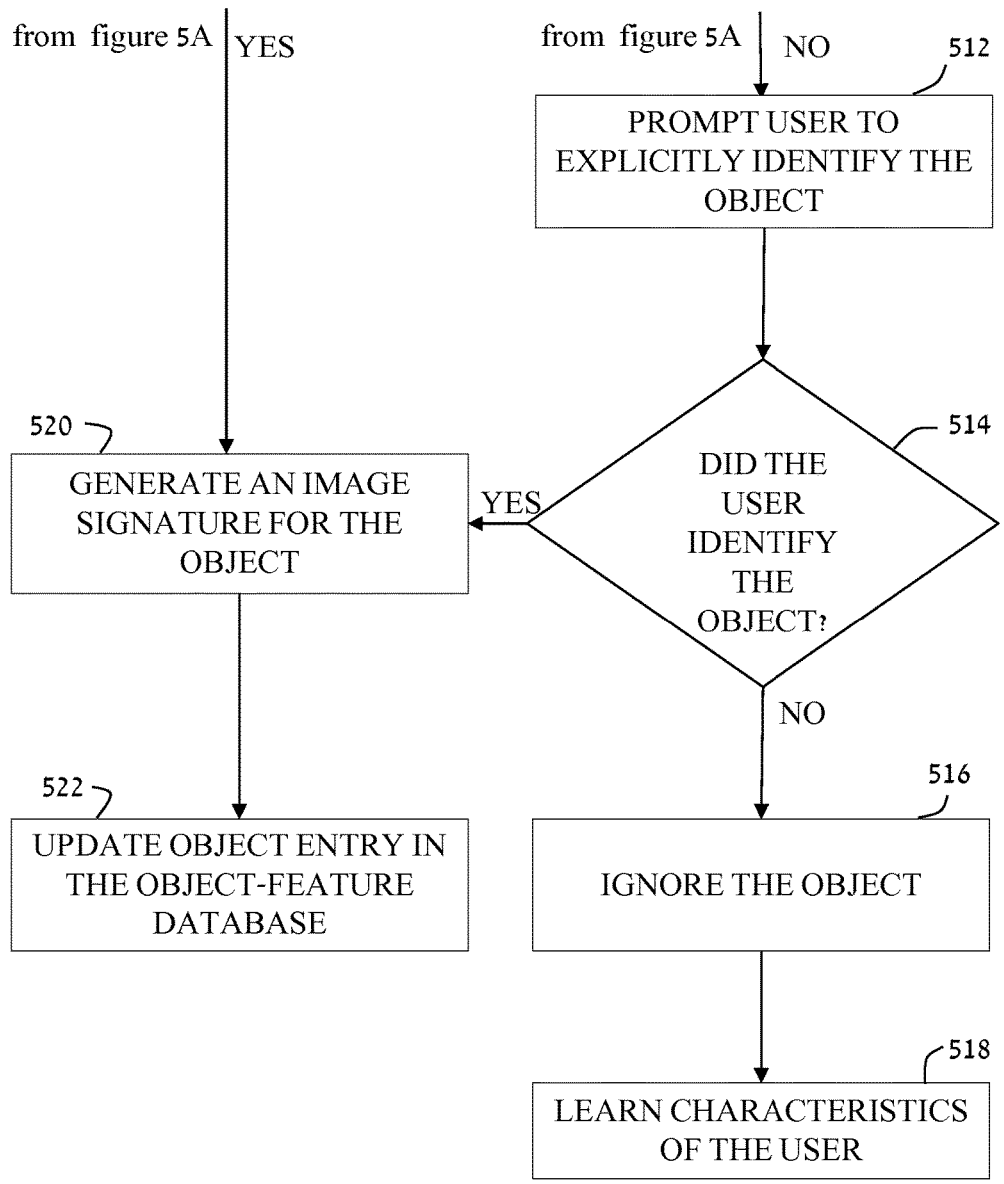

In addition to relating to FIG. 1, reference is now made to FIGS. 5A and 5B, which, taken together, are a flow chart of an embodiment of a method for updating an object-feature database according to an embodiment of the teachings herein.

As seen in FIG. 5A, at step 500 an image of the vicinity of device 100 is captured by image capturing elements 106 and 108, and at step 502 the object identifier 120 compares the captured image, and particularly an image of an object in the captured image, to image signatures of objects in the object-feature database. If at step 504 the image signature of the object as found in the captured image is identical to an object signature stored in the object-feature database, at step 506 the image signature of the object in the object-feature database is marked as being up-to-date, and processing of the object may proceed, for example by tracking the object for motion and carrying out an action with respect to the identified object, as described hereinabove with reference to FIGS. 3A and 3B.

In some embodiments, processing of the object may proceed, for example by tracking the object for motion and carrying out an action with respect to the object, even if the image signature of the object as found in the captured image is not identical to an object signature in the object-feature database, provided that the object has been identified using other means, such as barcode reading, QR code reading, RFID tag reading, or any other suitable means of identifying the object.

If, on the other hand, the image signature of the object as found in the captured image is not identical to any image signature in the object-feature database at step 504, at step 508 object identifier 120 attempts to uniquely identify the object based on by identifying input captured at step 500.

In some embodiments the identifying input includes a barcode present on the object, for example provided by the user being prompted to scan the barcode in a barcode scanner (not shown) forming part of device 100 or to show the barcode to image capturing element 106 and/or 108. In some embodiments the identifying input includes a QR code present on the object, for example provided by the user being prompted to scan the QR code in a QR code reader (not shown) forming part of device 100 or to show the QR code to image capturing element 106 and/or 108. In some embodiments the identifying input includes information from an RFID tag present on the object, for example provided by the user being prompted to scan the RFID tag with an RFID sensor (not shown) forming part of device 100.

In some embodiments the identifying input includes information provided by one or more watermarks present on the object and identified by object identifier 120 in the captured image of the object. In some embodiments the identifying input includes information provided by one or more characters present on the object and identified by an Optical Character Reader (OCR) (not shown) functionally associated with object identifier 120 in the captured image of the object or in another image captured by image capturing devices 106 and/or 108.

In some embodiments the identifying input includes information gleaned from external sources, such as from browsing the Internet for a similar image and extracting relevant information from that image, or searching for a similar image in a database or search engine and extracting information relevant to the found image, or using the detected barcode or QR code to search an online image database in order to obtain a reference image of the object having sufficiently high image quality. In some such embodiments, a confidence score is assigned to the collected additional input and the object is considered uniquely identified only if the confidence score is above a predetermined threshold value.

If, at step 510, the object is not uniquely identified based on the additional input, at step 512 of FIG. 5B the user is prompted to explicitly identify the object using an input entry element (not shown) forming part of device 100 or to show the barcode and/or QR code to image capturing element 106 and/or 108.

In some embodiments, the display 104 of device 100 displays a Graphical User Interface (GUI) (not shown) with which the user may interact in order to identify the object. In some such embodiments, display 104 comprises a touch screen, and the user explicitly identifies the object by touching an image of the object or by typing information relating to the object on display 104. In some embodiments device 100 includes an input entry element (not shown) such as a mouse, a keyboard, a joystick, and the user operates the input entry element to interact with the GUI and explicitly identify the object. In some embodiments device 100 includes a sound sensor such as a microphone (not shown), and the user explicitly identifies the object by vocally providing a name and/or a description of the object.

If, at step 514, the user did not explicitly identify the object, object identifier 120 may ignore the captured image and stop trying to identify the object at step 516. In some embodiments, upon ignoring the object, at step 518 information learner 116 uses the characteristics of the image and/or of the triggering event that triggered capturing the image to learn and store information about the user, and particularly about characteristics of the user that should not be considered a reason to trigger operation of device 100. For example, information learner 116 may identify that when the image capturing device 106 was triggered to capture the image, the user was at a certain distance from device 100, and may conclude that when the user is at that distance from the device he does not intend to "show" an object to the device 100. Information learned by information learner 116 may be stored in the user information database for future use.

If at step 510 the object was uniquely identified by the additional input, or if at step 514 the object was explicitly identified by the user, such that the exact identity of the object is now unambiguous to object identifier 120, object identifier 120 triggers image capturing elements 106 and 108 to capture images of the objects and generates from the captured images an image signature for the object, at step 520. At step 522 the generated image signature and, in some embodiments, all the input collected at step 508, are used to update an entry for the object in the object-feature database, or to generate a new entry for the object in the object-feature database if no such entry exists.

In some embodiments the image signature comprises one or more images of the object. In some embodiments the image signature comprises a virtual three dimensional model of the object. In some embodiments the image signature comprises one or more characteristics of the object which may be extracted from an image of the object, such as a color scheme of the object, lettering or other text present on the object, graphics present on the object, a three dimensional shape of the object, watermarks and other marks present on the object which are invisible to the human eye, a name of the object, a brand of the object, and the like.

In some embodiments, particularly when the object was identified by using additional input not provided by the user, a confidence score is assigned to the generated image signature, indicating how likely it is that the image signature is an accurate representation of the object.

In some embodiments, an image signature entry may be created for a non-specific object. For example, the user may present a cereal package to the image capturing element 106 and/or 108, and in parallel say the word "cereal", which may be captured by the microphone. Because the word "cereal" does not uniquely define the product, an image signature created from the image is an unspecific image signature associated with the word "cereal". It is appreciated that with time, device 100 may learn an SKU related to the image, for example by crowd sourcing as described hereinabove.

It is appreciated that learning as described hereinabove with respect to FIGS. 5A and 5B typically takes place in the background, while the user adds items to, removes items from, or otherwise manipulates his list. In some typical embodiments, the user is oblivious to the learning process being carried out in the background.

As mentioned hereinabove in the Summary of the Invention, some embodiments of the invention relate to smart, user friendly methods for identifying a suitable product for a user, such as a substitute for a product specifically desired by the user.

Some embodiments of the invention relate to methods for identifying a suitable product for a user, the method comprising:

obtaining a product dataset comprising a group of products, the products being divided into subgroups according to title, wherein each product is associated with at least one of a brand and a set of features describing the product, and wherein a weight is associated with the brand and with each feature;

receiving from a user an initial identification of a desired product having a specific title associated therewith;

using information in the product dataset and at least one of user-specific information and device-specific information, uniquely identifying a specific desired product intended by the user in the initial identification;

using the weights of the brand and of the features, computing a distance between the specific desired product and at least two other products in the specific title; and identifying at least one of the other products, having a small distance from the specific desired product, as a suitable product for the user.

Some embodiments of the invention relate to devices for identifying a suitable product for a user, comprising:

a user input entry element configured to receive from a user an initial identification of a desired product having a specific title associated therewith; and a processor functionally associated with the user input entry element and comprising:
- a product data accessor configured to access a product dataset comprising a group of products, the products being divided into subgroups according to title, wherein each product being associated with at least one of a brand and a set of features describing the product, wherein a weight is associated with the brand and with each feature;
- a desired product identification module configured to use information in the product dataset and user-specific information to uniquely identify a specific desired product intended by the user in the initial identification
- a distance computation module configured to use the weights of the brand and of the features to compute a distance between the specific desired product and at least two other products in the specific title; and
- a suitable product identification module configured to identify at least one of the other products, having a small distance from the specific desired product, as a suitable product for the user.

Figure 6:
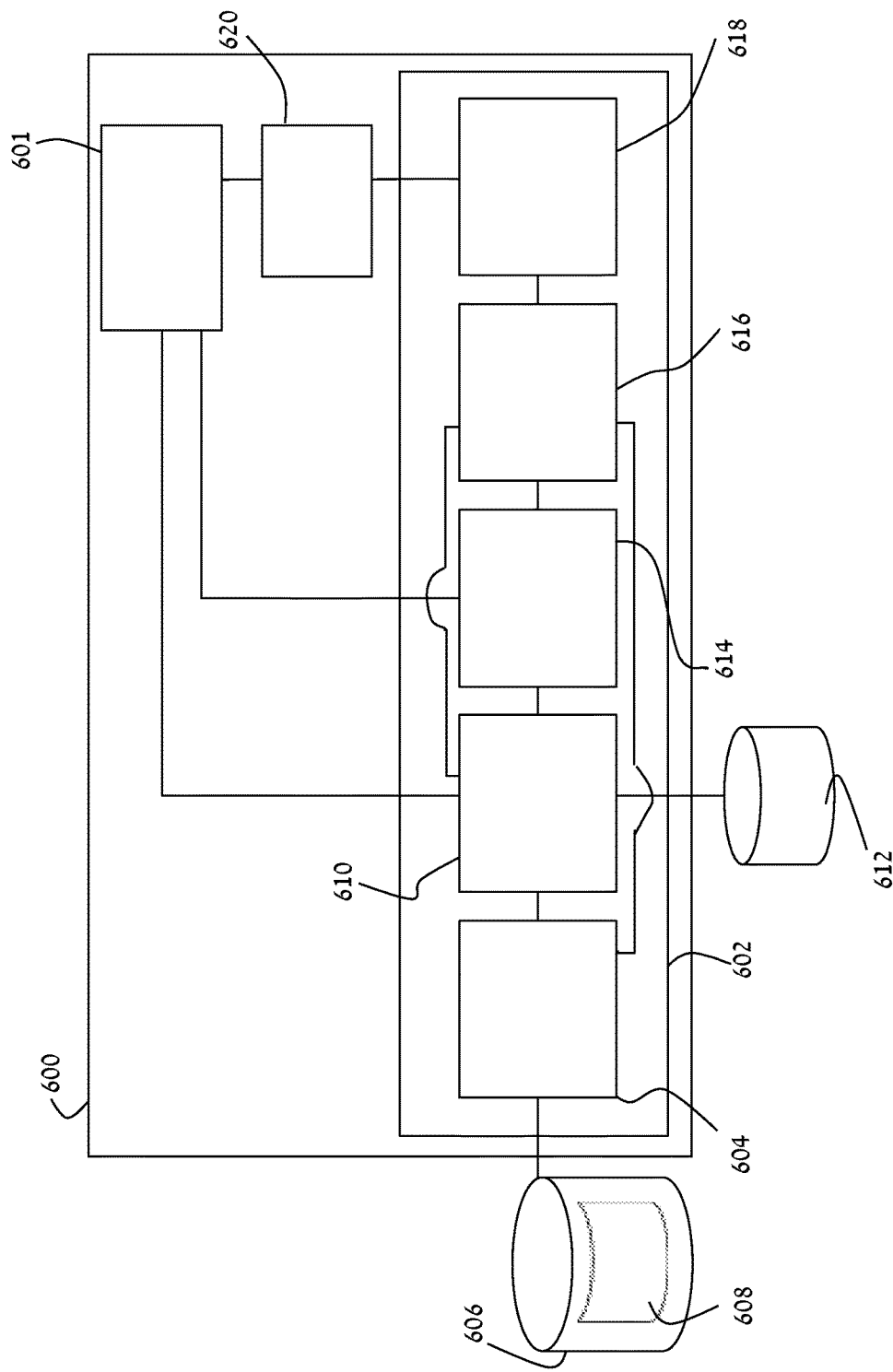
FIG. 6 is a schematic block diagram of an embodiment of a device used for identifying a suitable product for a user according to an embodiment of the teachings herein.

Reference is now made to FIG. 6, which is a schematic block diagram of an embodiment of a device 600 used for identifying a suitable product for a user according to an embodiment of the teachings herein.

Device 600 as illustrated may be implemented on any suitable device. As will be appreciated from the description hereinbelow, device 600 may be implemented on any mobile or stationary computing system, including a dedicated computing device, a desktop computer, a laptop computer, a tablet computer, a suitably configured mobile phone, a smart phone, a PDA, and the like.

As seen in FIG. 6, device 600 comprises a user input entry element 601 configured to receive input from a user, and a processor 602.

User input entry element 601 may be any suitable user input entry element with which the user may interact to provide input to device 600. That said, in some embodiments, the user input entry element comprises at least one of a keyboard, a touch screen, a computer mouse, a joystick, a microphone, a port for connection to an input device such as a USB flash drive, and mechanisms or software suitable for provision of images and other information, such as software, e.g. for uploading images and setting weights and/or priorities. For example, the user may upload images and/or set weights and priorities via a website or a Bluetooth® connection, which may then be transmitted from a server associated with the website or Bluetooth® connection to device 600. In some embodiments, user input entry element 601 may be configured to receive input provided by gestures, for example gestures identified in images processed by an image processing mechanism (not shown).

Processor 602 includes a product data accessor 604, functionally associated with a product feature database 606 and configured to access a product dataset 608 in database 606. The product dataset 608 includes a group of products, which products are divided into subgroups according to title. Within product dataset 608, each product is associated with a brand and a set of features describing the product. A weight is associated with the brand and with each feature for each product.

In some embodiments, database 606 and dataset 608 form part of device 600. In some embodiments, database 606 and dataset 608 are remote to the device 600. In such embodiments, product data accessor 602 may comprise a communication element, such as a transceiver, for communicating with database 606, or may access data in dataset 608 via a suitable transceiver (not shown).

The group of products may be any suitable group of products. That being said, in some embodiments the group of products comprises grocery products, electronics, books, pharmaceutical products, health care products, beauty care products, manufacturing products, agricultural products, games, gaming products, toys, clothing, shoes, entertainment products such as plays, concerts, and movies, vehicles, such as cars, motorcycles, and yachts, and the like.

In some embodiments, dataset 608 is geographically modular, such that product data accessor 604 of a device 600 located in the USA only has access to products in dataset 608 of products available in the USA, and for example, when the device is moved to Canada, product data accessor 604 may adapt and now have access to products in dataset 608 which are available in Canada. In some embodiments, device 600 also includes a GNSS receiver (not shown) functionally associated with product data accessor 604 and configured to identify a geographic region in which device 600 is located, and to inform product data accessor 604 of the identified region.

In some embodiments, the title comprises the natural name of a product. Exemplary titles may include, "milk", "fresh produce", "frozen vegetables", "children's books", "non-fiction books", and the like. Typically, each title has a plurality of products associated therewith. For example, fat free milk, low fat milk, whole milk, lactose free milk, and soy milk, would all be part of the title "milk".

In some embodiments, the brand relates to a manufacturer of the product. As such, in some embodiments, many products share a single brand. For example, the brand "Kit-Kat" may be associated with the products "Kit-Kat, 36-Count" and "KIT KAT CHUNKY Peanut Butter 48 g". In some embodiments, a single product may be associated with more than one brand, for example products associated with the brand "Kit-Kat" may also be associated with the brand "Nestle".

The features associated with a product may be any suitable features which describe the product, and may include, for example, flavor, nutritional identification such as "diet", "low fat", "sugar free", "gluten free", and "lactose free", denominational identification, such as "vegetarian", "vegan", "Kosher", and "Halal", price, size of packaging, and the like. Typically, each feature is associated with a set of possible values which it may receive.

Product dataset 608 may be formed in any suitable way. In some embodiments, the dataset 608 is automatically generated by a suitable computing device, which may be a dedicated computing device or may be device 600. In some embodiments, the computing device is configured, for each product, to automatically identify the product's title, brand, and features, and to automatically build a suitable entry in product dataset 608. In some embodiments, the product's title, brand, and features are identified using at least one of keywords in the product name, keywords in the product description, keywords found on the packaging of the product, information gleaned from external sources, such as manufacturer and distributor websites. In some embodiments in which the product comprises a food product, the title, brand, and features may also be identified using information gleaned from the nutritional values of the product, and information gleaned from the list of ingredients of the product.

In some embodiments, the dataset may be automatically obtained at suitable locations. For example, in a supermarket, images obtained by security cameras observing the checkout points may be correlated with barcode and other information registered by the cashier during checkout, and each product identified this way may be added to the dataset or updated within the dataset. In such cases OCR may be used to extract brand and feature information from the captured image of the package.

In some embodiments, a human operator oversees the dataset creation, and may approve the information collected for each product and/or add other information for each product. In some such embodiments, the human operator may also identify mistakes in the creation of the dataset, such as associating a product with the wrong title, and may use machine learning techniques to "teach" the system how to avoid such mistakes.

In some embodiments, users of the system function as the human operator. In some such embodiments, users can indicate wrong data directly, for example by interacting with a suitable user interface in which the users may report a problem. In some embodiments, when a specific product is offered as a substitute for another product, and the specific product is never selected by users, this provides to the system an indication that there is a problem with the data of one of the specific product and the product which it is substituting.

It is a particular feature of the teachings herein that the weights associated with the brand and/or features may be user-specific, or may be tailored to the needs of a specific user, as described herein.

In some embodiments, processor 602 also includes an information learner 610, functionally associated with a user information database 612 and with product data accessor 604, and in some embodiments with user input entry element 601. In some embodiments (not illustrated), user information database 612 and database 606 form a single database, such that information learner 610 can directly access database 606 and dataset 608.

In some embodiments, user input entry element 601 is configured to receive from the user-specific weights to be assigned to at least one feature and/or to the brand. In some such embodiments, information learner 610 is configured to store the user's preferences as provided to user input entry element 601, for example in user information database 612.

In some embodiments, information learner 610 is configured to learn the specific weights over time, for example based on choices the user makes after being offered the choice of two or more suitable products, or based on the user's product history, for example as described hereinbelow with reference to FIG. 8.

As an example, if the user's product history shows that when selecting a specific product the user is oblivious to the color of the product, user-specific learner 610 is configured to learn that the color of the specific product doesn't matter much to the user, and to effect lowering of the weight of the "color" feature for that specific product, for a title associated with that specific product, or for all products, in the dataset with respect to the user, for example via product data accessor 604.

In some embodiments, information learner 610 is configured to learn the weights associated with the brand and features of each product based on a user-segment with which the user is associated. In such embodiments, each user is associated with one or more user-segments. For example, a user may be associated with a segment of children, a segment of men, a segment of women, a segment of vegetarians, a segment of vegans, or a segment of history buffs. In some embodiments, the user is automatically assigned to one or more user-segments based on user-specific information such as the user's purchase history, as known in the art.

Information learner 610 may then use characteristics of the user-segment, or information collected about other users in the same user-segment, to update the user-specific weights of the brand and/or features for a product with respect to the user. For example, information learner 610 may aggregate information relating to product history and substitute product selection history for all users in the user's segment, and may then adjust the weights for the brand and/or features in the dataset with respect to the user and/or to segment based on the aggregated information, based on a form of crowd sourcing. In some embodiments, segment-specific information is combined with user-specific information to more accurately assign weights to products for a given user.

For example, in the context of food products, the user may be associated with a segment of vegetarians. Accordingly, information learner 610, via data accessor 604, assigns suitably low weights to brand and features of products containing meat.

In some embodiments, data accessor 604 of processor 602 is also configured to update the weights associated with the brand and features of each product based on market trends and/or on seasonal considerations. For example, during the winter, a higher weight may be given to a feature of "eaten hot", and a lower weight may be given to a feature of "eaten frozen".

As another example, during holiday seasons, a higher weight may be given to holiday related features such as "contains chocolate mint", "suitable for holiday", "suitable for hosting", "elegant", and the like.

In some embodiments information learner 610 automatically learns the seasonal effects for a user, a user-segment, or for the general population, and automatically sets the weights accordingly during the suitable season.

In some embodiments, data accessor 604 of processor 602 is also configured to update the weights associated with the brand and features of each product based on the user's habits, for example as learned by information learner 610. For example, if the user has a shopping habit, such as having a big groceries delivery grocery shops every Wednesday and replenishing with smaller groceries deliveries every Sunday, data accessor 604 may update the weights based on the day of the week, such that products normally purchased in the big groceries delivery will have higher weights on Tuesday and Wednesday, and products normally purchased on Sundays will have higher weights on Saturday and Sunday.

In some embodiments, the weights associated with the brand and features of each product are also determined based on the user's priorities. Typically, product priorities relate to a category of products or features which should be given a higher or lower weight than that calculated based on the segment or user history, or which should override other features or products.

In some such embodiments, the user may use user input entry element 601 to expressly define his or her priorities which should be considered when identifying a suitable product for the user. In other embodiments, information learner 610 may learn the user's priorities over time, for example by observing and/or analyzing the user's product history or substitute products selected by the user.

In some embodiments, data accessor 604 automatically adjusts the weights of the brand and/or the features based on the user-specific product purchase priorities.

For example, the user may indicate via user input entry element 601, or information learner 610 may automatically learn, that the user is highly health conscious always selects the product with the lowest fat content. Thus, the weights may be adjusted such that low fat products will be more likely to be selected as suitable products for the user.

As another example, the user may indicate via user input entry element 601, or information learner 610 may automatically learn, that the user is highly cost conscious and would always prefer the cheaper product. Thus, the cost-per-unit feature may be given a suitably high weight, such that a more cost effective, or cheaper, product will be selected, even if it is less similar to a product initially desired by the user or less suitable to the user's needs. For example, the user may indicate via user input entry element 601, or information learner 610 may automatically learn that the user always purchases the cheapest product in each category. Thus, the weights may be adjusted such that mostly, and in some embodiments only, the cheapest products in each category will be selected as suitable for the user.

Alternately or additionally, the user may indicate via user input entry element 601, or information learner 610 may automatically learn a user-specific cutoff priority criterion. For example, the user may indicate, or the system may learn, that the user never purchases any product costing more than a predetermined amount, for example $100. Thus, the weights may be adjusted such that mostly, and in some embodiments only, products costing less than $100 will be selected as suitable for the user.

In some embodiments, in addition to receiving from the user an indication of the user-specific priorities, user input entry element 601 is configured to receive from the user an indication of the desired optimization aggressiveness level for the provided user-specific priorities. For example, the user may indicate that he wishes to save money, causing the system to increase the weight of the price feature, such that in some cases, a product having a lower price would be selected as a suitable product for the user, even if it is not the most suitable product with respect to other features or priorities. Additionally, in some embodiments, additional substitute products are presented to the user in decreasing order of priority as defined by the user, or, in the example above, in increasing order of cost.

For example, if the user asked to optimize for cost based on a given product, and three substitute products which are close in their features to the given product have three different prices, the substitute product with the lowest price will be presented as the first proposed substitute, the substitute product with the middle price will be presented as the second proposed substitute, and the substitute product with the highest price will be presented as the third, or last, proposed substitute.

It is appreciated that the magnitude of the effect of each of the weights assigned to the features and of the product priorities may be determined per user, for example using information learned by information learner 610. Similarly, the specific characteristics of the product which contribute to the weight based computation of similarity, and the specific characteristics of the product which contribute to the optimization based on the user's priorities are determined per user, for example using information learned by information learner 610. As such, for some users, who always want to optimize for a given priority, optimization based on that priority will be favored even if it means that suggested substitutes are less similar to the desired product, while for other users, for whom similarity is more important, more similar products will be favored, and optimization based on user priorities will only take place when there are multiple products similar to the desired product.

In some embodiments, information learner 610 is configured to identify changes in the user's preferences over time, and to adjust the weights assigned to the features and/or the user's product priorities accordingly. For example, if a user is diagnosed with celiac disease, and stops purchasing products containing gluten, information learner 610 may identify this change and increase the weight given to the "gluten free" feature with respect to the user.

In some embodiments, processor 602 also includes a desired product identification module 614, functionally associated with user input entry element 601 and with information learner 610. As described hereinbelow with reference to FIG. 7, the desired product identification module 614 is configured to "guess" what product was intended by the user, when the user does not uniquely identify a desired product.

As seen in FIG. 6, processor 602 further includes a distance computation module 616, functionally associated with data accessor 604, with information learner 610, and/or with desired product identification module 614. Distance computation module 616 is configured to use the weights of the brand and of the features to compute a distance between a specific desired product and at least two other products having the same title as the desired product, as described hereinbelow with reference to FIG. 7.

Processor 602 further includes a suitable product identification module 618 configured to identify at least one of the other products, which were compared with the desired product by distance comparison module 616, as suitable for the user.

In some embodiments, user input entry element 601 and/or suitable product identification module 618 are functionally associated with a display 620, which may form part of device 600 (as illustrated) or may be functionally associated therewith. In some embodiments, the suitable product or products identified by module 618 may be presented to the user on display 620, and the user may use user input entry element 601 to interact with device 600 and to select one of the suitable products identified by suitable product identification module 618 as a good substitute for the desired product. As described hereinbelow with reference to FIG. 8, the information learner may use the user's selection to learn about the user's preferences, and/or to adjust the brand and feature weights for the user.

Figure 7:
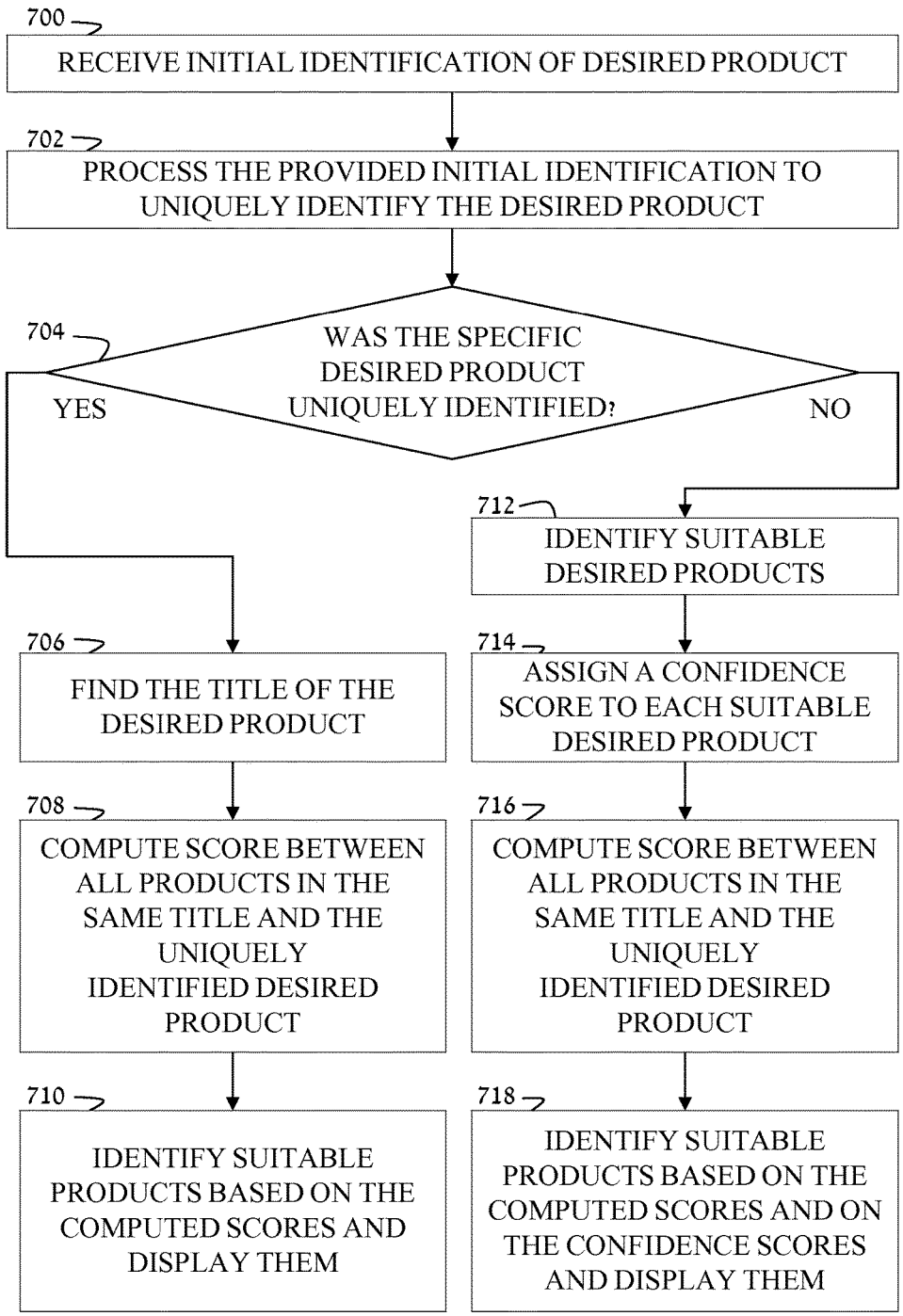
FIG. 7 is a flow chart of an embodiment of a method for identifying a suitable product for a user in accordance with an embodiment of the teachings herein.

Reference is now made also to FIG. 7, which is a flow chart of an embodiment of a method for identifying a suitable product for a user in accordance with an embodiment of the teachings herein.

As seen at step 700 of FIG. 7, device 600 receives from the user, via user input entry element 601, an initial identification of a desired product, and at step 702 processor 602 processes the provided initial identification to uniquely identify the desired product.

The initial identification of the desired product provided by the user may be any suitable initial identification. In some embodiments, the identification uniquely identifies the desired product. For example, the user may provide to the user input entry element an identification of the Stock Keeping Unit (SKU) of the desired product, a Universal Product Code (UPC) of the desired product, or a barcode of the desired product, which may be provided by scanning the barcode. In such embodiments, processing step 702 may be obviated.

In some embodiments, the initial identification provided by the user does not uniquely identify the product. For example, the user may provide to user input entry element 601 a title, a brand, a description of the product, or an alias of the product, either visually (textually) or vocally, or may provide an image of the desired product. In such embodiments, at processing step 702 the processor 602 processes the initial identification and attempts to identify the specific product which was intended by the user. In such embodiments, information learner 610 extracts from user information database 612 user-specific information, such as the user's product history, in order to assist in uniquely identifying the product which the user had intended to identify.

In embodiments in which the initial identification provided by the user comprises an image of the product, processor 602 uses image processing techniques to identify unique features of the product, and thereby to uniquely identify the product, substantially as described hereinabove with reference to FIGS. 2, 3A, and 3B.

In embodiments in which the initial identification provided by the user comprises a vocal identification of the product, processor 602 uses voice recognition techniques known in the art to transcribe the provided vocal identification. Once the vocal identification is transcribed, processor 602 continues to process the transcribed identification as if it were a textual identification of the product.

In embodiments in which the identification comprises a brand of the product, an alias of the product, a description of the product, and/or a title of the product, data accessor 604 of processor 602 accesses dataset 608, and information learner 610 accesses user information database 612, and tries to identify a product matching the initial identification provided by the user, for example having the features as described in the user provided description or matching user-specific preferences, and which is likely to be the product which was intended by the user, as described hereinbelow.

At step 704, if the processor was able to uniquely identify the specific product intended by the user based on the provided user identification and the product and user-specific information, data accessor 604 accesses dataset 608 to determine the title associated with the uniquely identified desired product, at step 706.

At step 708, distance computation module 616 computes a distance score between the uniquely identified desired product and each other product having the same title as the uniquely identified desired product.

For example, in some embodiments, distance computation module 616 computes a brand-distance score for the brand and feature-distance score for each feature, and computes a weighted average of the brand distance score and the feature-distance scores as the distance score between the uniquely identified desired product and another product having the same title. In some embodiments, distance computation module 616 uses the computed distance score to compute a product similarity score for the desired product and the other product, and the similarity score is used to determine a suitable product as described herein. It is appreciated that computing a weighted average of distance scores is merely an example of a method for computing the distance between the uniquely identified desired product and another product having the same title, and that any suitable distance computation may be used and is considered in the scope of the teachings herein.

In some embodiments, distance computation module 616 computes a parameter distance based on parameter scores for optimization priorities and optimization aggressiveness levels provided by the user or learned by information learner 610, as described hereinabove. Distance computation module 616 then computes a product relevance score based on the computed parameter distance scores and on the product similarity score, such that the product relevance score is used to determine a suitable product as described herein.

At step 710, suitable product identification module 618 identifies one or more products having the same title as the desired product and having a good similarity score to, or a small distance from, the desired product, and provides information relating to the uniquely identified desired product and the other suitable products to the display 620 for presentation to the user.

In some embodiments, images of the desired product and the other suitable products are displayed to the user on display 620. In some embodiments, information regarding the desired product and the other suitable products, such as nutritional information, is presented to the user on display 620.

In some embodiments, suitable product identification module 618 identifies as a suitable product any product having a distance from the desired product which is smaller than a distance threshold. In some embodiments, suitable product identification module 618 identifies as a suitable product any product having a product similarity score to the desired product which is greater than a similarity threshold. In some embodiments, suitable product identification module 618 identifies as a suitable product any product having a product relevance score to the desired product which is greater than a relevance threshold.

In some embodiments, all the products identified by suitable product identification module 618 are displayed on display 620, in some embodiments alongside the desired product. In some embodiments in which the user only wishes to find a substitute for the desired product, the information of the desired product is not displayed to the user. In some embodiments, the number of products identified by suitable product identification module 618 is limited by a predetermined maximal number. In some embodiments, the number of products displayed on display 620 is limited by a predetermined maximal display number. In some such embodiments, the products displayed on display 620 are a subset of the products identified by suitable product identification module 618.

Returning to step 704, if processor 602 was unable to uniquely identify the specific product intended by the user based on the initial identification provided by the user and on the product and user-specific information, the specific product intended by the user has to be identified, or "guessed" based on the user-specific or segment-specific information.

Therefore, in some embodiments, at step 712 desired product identification module 614 uses the user-specific information and segment-specific information learned by information learner 610 to identify suitable desired products matching the initial identification provided by the user.

In some embodiments, desired product identification module 614 uses data accessor 604 to access dataset 608, and information learner 610 to access user information database 612, so as to retrieve product information for products matching the initial identification provided by the user, and for user-specific and/or segment-specific information. Desired product identification module 614 then tries to identify a product matching the initial identification provided by the user, and which is likely to be the product which was intended by the user.

For example, in some embodiments, desired product identification module 614 may use identification of groups of products which are purchased together, and may identify whether or not the user has purchased one or more of the products in the group within a predetermined duration. In some such embodiments, the products purchased together are identified, for example by information learner 610, in data aggregated from many users, for example all from all users in the user-segment associated with the user. For example, the information learner 610 may detect that in a certain percentage of the cases, people who purchased pasta sauce also purchase pasta within 60 days of the purchase of pasta sauce. Therefore, if the user had recently purchased pasta sauce, this information may be indicative and helpful in identifying a suitable desired product, for example of if the user gives as the initial identification a brand which includes pasta products and other products.

At step 714, desired product identification module 614 assigns to each identified suitable desired product a confidence score, for example indicative of how likely it is the identified suitable desired product is the desired product intended by the user and how unlikely it is that the identified suitable desired product is not the desired product intended by the user. Thus, the confidence score is affected by how suitable the product is to the user, for example as determined using user-specific and segment-specific information, and by how many other products are equally, or substantially equally, suitable to the user.

In some embodiments, desired product identification module 614 assigns confidence score based on user-specific and segment-specific information learned over time, on the user's specific shopping or product use habits, on the user's loyalty to familiar products, and/or on product-product association as described hereinabove. For example, if the user provided the title "milk", and the user history shows that the user purchases skim milk once a month and whole milk once a week, the confidence scores given to skim milk and whole milk will depend on how much time has passed since the user had last purchased skim milk and whole milk.

As another example, if the desired user provided as the initial identification the title "milk", and the user purchases whole milk and soy milk regularly and at equal intervals, such that both are equally suitable for the user, the confidence score given to whole milk and to soy milk will be relatively low, as it is very difficult to "guess" which one the user had intended. If, on the other hand, the user purchases whole milk regularly and soy milk infrequently, such that soy milk is less likely to be purchased by the user and whole milk is more likely to be purchased by the user, whole milk will be given a higher confidence score, as it is clearly the better "guess" of the user's intentions.

In some embodiments, once suitable desired products are identified, the distance computation module 616 computes a distance score between each suitable desired product and each other product having the same title as the suitable desired product, at step 716, substantially as described hereinabove with reference to step 708.

At step 718, for each suitable product identification module 618 identifies one or more products having the same title as the desired product and having a good similarity score to, or a small distance from, the suitable desired product, and provides information relating to the suitable desired product and the other suitable products to the display 620 for presentation to the user, substantially as described hereinabove with reference to step 710. In some embodiments, suitable product identification module 618 assigns to each identified suitable product a confidence score corresponding to the confidence score of the suitable desired product to which it is similar.

In some embodiments, the order in which the identified suitable desired products and the substitute suitable products are presented on display 620 is dependent on multiple criteria, such as the confidence score assigned to each of the identified suitable desired products and the level of similarity between each identified desired product and suitable substitutes for that product. For example, if a first identified suitable desired product has a high confidence score, and a second identified suitable desired product has a low confidence score, the product with the higher confidence score will be presented before the product with the lower confidence score. In some embodiments, also substitutes for the first suitable desired product, which are very similar to the first suitable desired product, will be presented before the second identified suitable desired product.

In some embodiments, information learner 610 is configured to use the confidence score and/or the user's choice of product for the given title to learn about the user's preferences and priorities, and to effect updating of the weights of the brand and/or features based on the learned preferences.

In some embodiments, images of one or more of the suitable desired product and the other suitable products are displayed to the user on display 620. In some embodiments, information regarding the one or more suitable desired product and the other suitable products, such as nutritional information, is presented to the user on display 620.

In some embodiments, only suitable desired products having a confidence score above a predetermined confidence threshold are presented on display 620.

Figure 8:
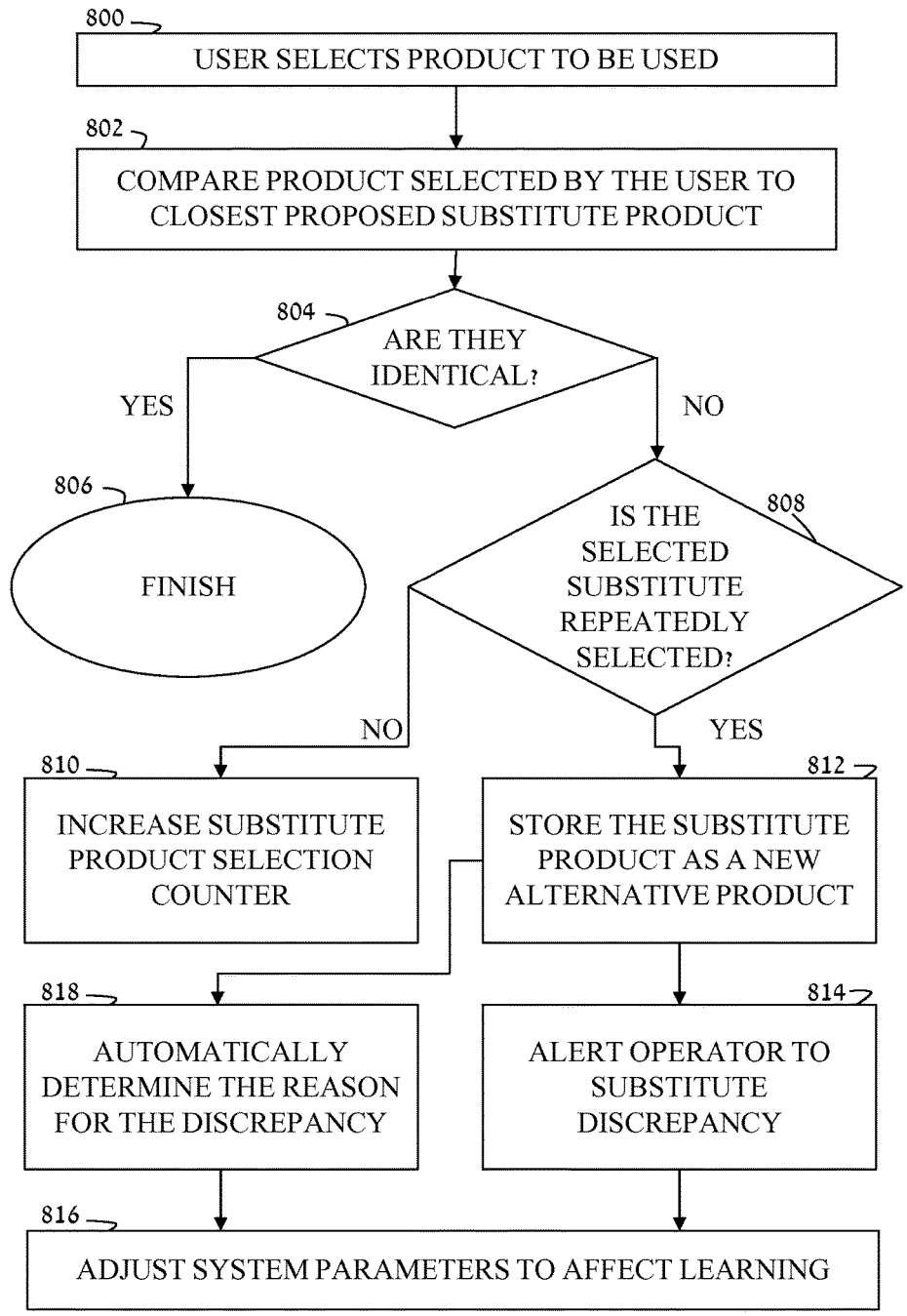
FIG. 8 is a flow chart of an embodiment of a method for learning user preferences for identification of a suitable product for the user in accordance with an embodiment of the teachings herein.

Reference is now made to FIG. 8, which is a flow chart of an embodiment of a method for learning user preferences for identification of a suitable product for the user in accordance with an embodiment of the teachings herein. It is appreciated that the method described hereinbelow with reference to FIG. 8 may be considered a continuation of the method of FIG. 7.

As discussed hereinabove with reference to steps 710 and 718 of FIG. 7, a desired product (either explicitly identified by the user or automatically identified by device 600) and suitable substitute products are presented to the user on display 620. It is appreciated that the method described with reference to FIG. 8 is an exemplary method, and that user-specific and segment-specific information, such as which products may be considered substitutes for a given product for a specific user or segment, may be learned in any other suitable way, such as, for example, by analyzing the user's shopping cart or list and the user's purchase history.

As seen at step 800 of FIG. 8, once the desired product and suitable substitutes are presented to the user on display 620, the user interacts with user input entry element 601 and selects the product to be used. For example, the product may be one on which an action should be carried out, for example as described hereinabove with reference to FIGS. 3A to 4B.

At step 802 information learner 610 of processor 602 compares the substitute products suggested to the user, and in some embodiments to the "best", or closest, substitute product suggested to the user, with the product actually selected by the user at step 800.

If at step 804 it is determined that the user selected the closest proposed substitute product, nothing is learned, since device 600 properly identified the suitable substitute product for the user, and the method finishes at reference numeral 806.

However, if at step 804 the user selected a different substitute product than the closest proposed product, information learner 610 is configured to learn from this so that better substitutes are suggested next time. In order to determine whether the substitute selected by the user, which was different than the closes substitute, was selected by the user as part of the user's behavior pattern or was a singular occurrence, information learner 610 checks to see whether the selected substitute product is repeatedly selected by the user at step 808.

In some embodiments the substitute product is considered to be repeatedly selected if the user selects the product, for example as a substitute for another product, a predetermined number of times. In some embodiments, the substitute product is considered to be repeatedly selected if cumulatively, users in a segment associated with the user select the product, for example as a substitute for another product, a predetermined number of times. In some embodiments, the predetermined number of times is dependent on the distance of the substitute product from the identified suitable desired product, such that substitute products having a larger distance from the identified suitable desired product need to be selected by the user a greater number of times to be considered repeated products.

If the substitute selected by the user is not already considered a repeatedly selected product, a counter of the number of times that this substitute is selected is increased by information learner 610, at step 810.

If the substitute product is considered a repeatedly selected product, at step 812 information learner 610 stores the substitute product in user information database 612 as a new alternative for the desired product initially entered by the user (at step 700 of FIG. 7).

Following storing the substitute product as a new alternative, in some embodiments, an operator, such as an operator of dataset 608 or of user information database 612, is alerted to the discrepancy between the user's selection and the closest proposed substitute at step 814, and at step 816 adjusts the system parameters so as to ensure that the substitute favored by the user will be selected as the closest substitute in the future, thereby learning from the discrepancy between the user selected substitute and the closest proposed substitute.

Alternately or additionally, in some embodiments, processor 602 automatically detects a reason that the product selected by the user was not offered as the closest substitute at step 818, and automatically adjust system parameters at step 816.

In some embodiments, the processor detects whether the discrepancy between the user selection and the closest proposed substitute is due to characteristics of the title, such as, due to characteristics of the product, for example due to inappropriately assigned feature weights.

In some embodiments, adjusting the system parameters comprises adjusting product features for the closest proposed substitute, for the user selected substitute produce, and/or for the desired product. In some embodiments, adjusting the system parameters comprises changing the title associated with the closest proposed substitute, the user selected substitute, and/or the desired product. In some embodiments, adjusting the system parameters comprises adjusting the aggressiveness associated with the user's product priorities, so as to give more, or less, weight to the user's product priorities over the feature weights. In some embodiments, adjusting the system parameters comprises changing a product feature to be an optimization priority and vice versa.

It is appreciated that the device of FIG. 6 and the methods of FIGS. 7 and 8 may be used for many different applications and uses.

For example, the device methods of FIGS. 6 to 8 may be used for converting a title based groceries list to a UPC specific groceries list, such as one used for ordering groceries online. As another example, the device methods of FIGS. 6 to 8 may be used by an online vendor, who received a list of products to be purchased, to offer the user substitute products for products which are unavailable.

The device and methods of FIGS. 6 to 8 may also be used to offer a price comparison service tailored to the characteristics of the user. For example, the system would maintain data about all the products carried by at least two supermarkets, including pricing data. The user would provide a groceries list, either including specific designations of the desired products, such as UPCs, or including titles, descriptions, brands, or aliases of the products. The system would then offer the user the total cost for all the products in the list in each of the supermarkets. In each supermarket, the products used for computing the total cost are selected from the products carried by that supermarket using the method described hereinabove based on the user-specific and segment-specific information. In some such embodiments, the system may also offer a few possible product lists with different prices based on different optimization aggressiveness levels of the optimized parameters.

The device and methods of FIGS. 6 to 8 may also be used to offer search term completion which is specifically suited to the searching user based on the user-specific and segment-specific information. For example, when the user begins typing a search term, the system may check for titles, brands, aliases, and product descriptions starting with the partial search term provided as input. The system may use the method described hereinabove to guess what are the most probable products for which the user intends to search, and displays those products for the user's selection. The system may also offer titles, aliases, and/or brands in addition to offering specific possible products.

For example once a user typed "Mi" the system may offer the following options—

Title—Milk

Brand—Milka

Products—Mint Tea, Low-fat Milk, and the user may select a desired option. In cases in which the selected option is not a specific product but rather a title, brand, or alias, once the user has selected the desired option, he may be presented with a list of products within that option. In the example above, if the user selected the brand Milka, he will be presented with all the specific products of that brand.

The device and methods of FIGS. 6 to 8 may also be used to offer A-B testing optimization, in which the system looks for available products that are more suitable for the user based on his optimization priorities, and are similar enough to products the consumer is currently consuming. Once such a product is identified, it is provided to the consumer, possibly free of charge, possibly in a small quantity. The user may provide input regarding his satisfaction from the proposed product, or the system may automatically identify the user's satisfaction level based on the extent of purchasing of the proposed product following its proposal to the user. Based on the identified user consumption and satisfaction, the product may be included in the products likely to be purchased by the user, and the system may adapt so that the proposed product is identified as a desired product or as a suitable substitute in the method described herein.

In some cases, the system may automatically identify user consumption of the proposed product, for example using sensors that detect how quickly the product was consumed and/or if the package was thrown into the garbage empty or full.

Such testing optimization may also be supported by advertising, such that manufacturers can offer a sample of their products to users for whom the product may be suitable, particularly if the advertised product is more suitable based on the user's optimization priorities. In some cases, if the system identifies that a high enough percentage of consumers in a certain segment, or having similar optimization priorities, have switched to using the proposed product instead of a product they were previously using, it may adapt the product weights such that the new proposed product will be more likely to be offered to users of that segment or having those optimization priorities.

In the context of the present application, the terms "object" and "product" relate to any object which may be used by a user in a retail or commercial setting, including purchasable products, retail products, wholesale products, warehouse products, coupons, images, and manufacturing products, and may relate to products of any type, including for example groceries, electronics, health care products, cosmetic products, books, toys, games, and vehicles.

In the context of the present application, the term "retail venue" relates to any venue at which objects or products are sold, be it a physical location or a virtual location, and includes retail stores, wholesale stores, warehouses, online stores, and sales booths.

In the context of the present application, the term "title" relates to a natural name of a product, as used by people in standard conversation, or to any other keyword or phrase that can be used to describe the object or a group of objects.

In the context of the present application the term "feature", when applied to an object or a product, relates to any characteristic of the object or product which provides information regarding the object or product, and which may be used to uniquely identify the product and/or to identify substitutes for the product.

In the context of the present application, the term "segment" relates to a group of users or a group of products sharing common characteristics, such that machine learning algorithms may use the common characteristics to learn about each user or product within the segment.

In the context of the teachings herein, the term "alias" relates to a name users commonly use for the product, which is not the product's title or brand. For example, an alias for a plurality of products may be "dessert".

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

Section headings are used herein to ease understanding of the specification and should not be construed as necessarily limiting.

The invention claimed is:

1. A method for creating and updating at least one of a list and a database with respect to at least one stock item, the method comprising:

using an image capturing element, capturing at least one image of a stock item in a vicinity of said image capturing element;

analyzing said at least one image to identify features of said stock item;

uniquely identifying said stock item based at least on said identified features;

tracking motion of at least one of said stock item, another object, and a hand, to detect at least one user gesture;

interpreting said at least one detected user gesture to identify an action associated with said gesture, said action relating to at least one of an update to a list of objects and a change in a display associated with said list of objects; and based on said interpreting, carrying out said action, wherein at least one of said identifying said stock item and said interpreting said at least one detected user gesture is based on a combination of at least two of the following:

specific gesture information identifying gestures associated with specific user actions;

user specific information relating to gesture nuances of a specific user and to preferences of said specific user;

segment specific information associated with a segment of users including said specific user, said segment specific information relating to at least one of gestures and preferences of users in said user-segment; and object specific information relating to physical characteristics of said stock item, and wherein at least one of said user specific information, said segment specific information, and said object specific information, is obtained using machine learning techniques.

2. The method of claim 1, further comprising automatically learning said user-specific information over time, and wherein said user-specific information comprises at least one of:

information regarding a purchase history of said user, information regarding a list history of said user, information regarding speech of said user, information regarding one or more segments of users with which said user is associated, and information relating to user-specific aspects when triggering said image capturing element to capture said at least one image, said user-specific triggering aspects including at least one of:

a distance of said user from said image capturing element at a time of said triggering;

a triggering gesture used by said user at the time of said triggering;

a speed of said triggering gesture;

timing of said triggering gesture;

a duration for which said user is in said vicinity of said image capturing element for the purpose of said triggering;

characteristics of a holding pattern in which said user holds said stock item during said triggering;

a tendency of said user to trigger action of a device associated with said image capturing element using a vocal command; and characteristics of a sequence of actions carried out by said user to trigger action of said image capturing device.

3. The method of claim 1, wherein said capturing said at least one image further comprises automatically triggering said image capturing element to exit a sleeping mode and to capture said at least one image, said automatically triggering comprising:
using at least one sensor, scanning said vicinity of said image capturing element to identify a user-specific motion pattern in said vicinity of said image capturing element; and
triggering said image capturing element upon identification of said user-specific motion pattern.

4. The method of claim 1, wherein said capturing said at least one image further comprises automatically triggering said image capturing element to capture said at least one image, said automatically triggering comprising recognizing at least one predetermined triggering gesture performed by said user, and said user-specific information comprises user-specific nuances of said at least one predetermined triggering gesture.

5. The method of claim 1, wherein said capturing said at least one image further comprises automatically triggering said image capturing element to capture said at least one image, said automatically triggering comprising:
analyzing behavior of said user to identify a specific action which the user wishes to carry out; and
activating specific components of a device associated with said image capturing element suited for carrying out said identified specific action.

6. The method of claim 1, also comprising illuminating said stock item during said capturing said at least one image using backlighting of a display functionally associated with said image capturing element,
wherein said at least one image captured by said image capturing element comprises a plurality of images, and said using backlighting comprises using said backlighting of said display to illuminate said stock item in a controlled fashion so as to illuminate said stock item from different angles thereby to generate different shadow patterns in different ones of said plurality of images.

7. The method of claim 1, also comprising associating each user with at least one said user-segment prior to said interpreting, and automatically learning said segment-specific information over time.

8. The method of claim 1, wherein said tracking motion comprises at least one of:
identifying in an image signature of said stock item a three dimensional area having at least one strong spatial gradient, and tracking said area to identify a trajectory of motion of said stock item; and
extracting a plurality of measurements of local features distributed at different locations of said at least one image of said stock item, and tracking said local features to identify a trajectory of motion of said stock item.

9. The method of claim 1, wherein said interpreting said user gesture comprises at least one of:
using said user-specific information to identify user-specific nuances of a gesture associated with a specific said action corresponding to said tracked motion; and
using said user-specific information and information regarding at least one physical-feature of said stock item to identify a user-specific gesture, suitable for an object having said at least one physical feature, associated with a specific said action corresponding to said tracked motion.

10. The method of claim 1, wherein said interpreting is also based on device-specific information relating to users of a specific device including said image capturing element, which device-specific information is learned over time.

11. The method of claim 1, wherein if no action associated with said detected user gesture is identified, said method also comprises:
obtaining additional input regarding said detected gesture;
characterizing aspects of said detected gesture;
identifying whether said detected gesture is a repeated gesture;
if said detected gesture is not identified as a repeated gesture, storing said detected gesture as a potential gesture; and
if said detected gesture is identified as a repeated gesture:
identifying at least one of whether said detected gesture is user dependent and whether said detected gesture is package dependent;
associating an action with said gesture; and
storing said detected gesture and said action associated therewith based on said identified dependence.

12. The method of claim 1, wherein when said analyzing said at least one image does not uniquely identify said stock item, said uniquely identifying comprises:
based on said analyzing said at least one image, identifying a plurality of possible stock items which may be included in said at least one image;
assigning a confidence score to each of said plurality of possible stock items;
using at least one of said user specific information, said segment specific information, and said object specific information for each of the possible stock items, updating said confidence score for each of said plurality of possible stock items; and
based on the confidence scores determining which of the plurality of possible stock items is most likely to be said stock item in said at least one image.

13. The method of claim 12, wherein said uniquely identifying further includes, if said confidence score is below a predetermined threshold, receiving from the user additional input uniquely identifying said stock item in said at least one image.

14. The method of claim 1, further comprising, receiving a voice command from said user for at least one of updating said list of objects and changing said display associated with said list of objects, said voice command specifically identifying said stock item.

15. A device for creating or updating at least one of a list and a database with respect to at least one stock item, the device comprising:
an image capturing element configured to capture at least one image of a stock item in a vicinity of said image capturing element; and
an object identifier functionally associated with said image capturing element and configured to analyze said at least one image captured by said image capturing element, to identify features of said stock item, and to uniquely identify said stock item based on first obtained information including at least said identified features;
a motion identifier configured to track motion of at least one of said stock item, another object, and a hand to detect at least one user gesture;
a gesture interpreter, functionally associated with said motion identifier, configured to interpret said at least one detected user gesture based on second obtained information to identify an action associated with said gesture, said action relating to at least one of an update to a list of objects and a change in a display associated with said list of objects, at least one of said first obtained information and said second obtained information including a combination of at least two of the following:

specific gesture information identifying gestures associated with specific user actions;

user specific information relating to gesture nuances of a specific user and to preferences of said specific user;

segment specific information associated with a segment of users including said specific user, said segment specific information relating to at least one of gestures and preferences of users in said user-segment; and object specific information relating to physical characteristics of said stock item;

an information learner, functionally associated with said gesture interpreter and configured to learn at least one of said user specific information, said object specific information, and said object specific information using machine learning techniques; and an action module functionally associated with said gesture interpreter and configured, based on said interpretation of said gesture interpreter, to carry out said action associated with said gesture.

16. The device of claim 15, wherein said information learner is configured to automatically learn said user-specific information which relates to gestures and preferences of a specific user over time and to store said learned user-specific information, wherein said information learner is configured to learn at least one of:

information regarding a purchase history of said user, information regarding a list history of said user, information regarding speech of said user, information regarding one or more segments of users with which said user is associated, and information relating to user-specific aspects when triggering said image capturing element to capture said at least one image, said user-specific triggering aspects including at least one of:

a distance of said user from said image capturing element at a time of triggering said image capturing element;

a triggering gesture used by said user at said time of said triggering;

a speed of said triggering gesture;

timing of said triggering gesture;

a duration at which said user is in said vicinity of said device for the purpose of said triggering;

characteristics of a holding pattern in which said user holds said stock item during triggering;

a tendency of said user to trigger action of said device using a vocal command; and characteristics of a sequence of actions carried out by said user to trigger action of said device.

17. The device of claim 15, wherein said information learner is configured to associate each user with at least one user-segment and to automatically learn segment-specific information relating to preferences of users in said user-segment over time.

18. The device of claim 15, wherein said motion identifier is configured to at least one of:

identify in an image signature of said stock item a three dimensional area having at least one strong spatial gradient, and to track said area thereby to identify a trajectory of said tracked motion; and extract a plurality of measurements of local features distributed at different locations of said image of said stock item, and to track said local features thereby to identify a trajectory of said tracked motion.

19. The device of claim 15, wherein said gesture interpreter is configured to at least one of:

use said user-specific information to identify user-specific nuances of a gesture associated with a specific said action corresponding to said tracked motion; and use said user-specific information and information regarding at least one physical-feature of said stock item to identify a user-specific gesture, suitable for an object having said at least one physical feature, associated with a specific said action corresponding to said tracked motion.

20. The device of claim 15, wherein if said gesture interpreter does not identify any action associated with said detected user gesture, said gesture interpreter is configured to:

obtain additional input regarding said detected gesture;

characterize aspects of said detected gesture;

identify whether said gesture is a repeated gesture;

if said gesture is not identified as a repeated gesture, store said gesture as a potential gesture; and if said gesture is identified as a repeated gesture:

identify at least one of whether said gesture is user dependent and whether said gesture is package dependent;

associate an action with the repeated gesture; and store said gesture and the action associated therewith based on said identified dependence.

* * * * *